US011599949B2

(12) United States Patent
Syed et al.

(10) Patent No.: US 11,599,949 B2
(45) Date of Patent: Mar. 7, 2023

(54) SYSTEMS AND METHODS FOR MULTIVARIATE ARTIFICIAL INTELLIGENCE (AI) SMART CARDS

(71) Applicant: The Travelers Indemnity Company, Hartford, CT (US)

(72) Inventors: Nabeel A. Syed, East Haven, CT (US); Murat Yasar, West Hartford, CT (US); Jason R. Vermes, West Hartford, CT (US); Carolyn C. Capshaw, Fairfield, CT (US); Ryan J. O'Connor, Tolland, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 16/891,459

(22) Filed: Jun. 3, 2020

(65) Prior Publication Data

US 2021/0383479 A1 Dec. 9, 2021

(51) Int. Cl.

*G06Q 40/00* (2012.01)
*G06Q 40/08* (2012.01)
*G06N 5/04* (2023.01)
*G06Q 10/10* (2023.01)
*G06Q 30/018* (2023.01)
*G06Q 30/016* (2023.01)
*H04L 9/40* (2022.01)
*G06K 7/14* (2006.01)
*G05B 19/042* (2006.01)
*G10L 17/06* (2013.01)
*H04L 51/02* (2022.01)

(Continued)

(52) U.S. Cl.

CPC ........... *G06Q 40/08* (2013.01); *G05B 19/042* (2013.01); *G06K 7/1417* (2013.01); *G06N 5/04* (2013.01); *G06N 20/00* (2019.01); *G06Q 10/10* (2013.01); *G06Q 30/016* (2013.01); *G06Q 30/0185* (2013.01); *G06V 40/172* (2022.01); *G10L 17/00* (2013.01); *G10L 17/06* (2013.01); *H04L 51/02* (2013.01); *H04L 63/0861* (2013.01); *H04M 1/72403* (2021.01); *H04W 4/027* (2013.01); *H04W 4/80* (2018.02); *G05B 2219/2642* (2013.01)

(58) Field of Classification Search

CPC ...................................................... G06Q 40/08
USPC .............................................................. 705/4
See application file for complete search history.

(56) References Cited

U.S. PATENT DOCUMENTS 10,529,028 B1 * 1/2020 Davis ..................... G06Q 40/08
10,643,749 B1 * 5/2020 Warner .................. G06Q 40/08

(Continued)

FOREIGN PATENT DOCUMENTS

WO WO-2020109950 A1 * 6/2020 ........... G06F 40/284

OTHER PUBLICATIONS

A Survey on IoT-enabled Home Automation Systems: Attacks and Defenses, IEEE (Year: 2021).*

(Continued)

*Primary Examiner* — Bruce I Ebersman
(74) *Attorney, Agent, or Firm* — RowanTree Law Group, PLLC; Carson C. K. Fincham

(57) ABSTRACT

Systems and methods for multivariate Artificial Intelligence (AI) smart cards are provided. An AI smart card may include, for example, pre-stored policy data that may be utilized as a portion of multivariate input by a suite of AI modules to formulate and analyze a claim of loss.

14 Claims, 14 Drawing Sheets

100

140 DATABASE

SMART CARD 106

NETWORK 104

CONTROLLER DEVICE 110

USER DEVICE 102a

USER DEVICE 102n

(51) Int. Cl.

| | |
|---|---|
| ***H04W 4/80*** | (2018.01) |
| ***H04W 4/02*** | (2018.01) |
| ***G06N 20/00*** | (2019.01) |
| ***G10L 17/00*** | (2013.01) |
| ***H04M 1/72403*** | (2021.01) |
| ***G06V 40/16*** | (2022.01) |

(56) References Cited

U.S. PATENT DOCUMENTS

| | | | | |
|---|---|---|---|---|
| 10,713,726 | B1 * | 7/2020 | Allen | G06Q 40/08 |
| 10,826,703 | B1 * | 11/2020 | Shipley | H04L 9/0637 |
| 11,049,094 | B2 * | 6/2021 | Filler | G06T 1/0021 |
| 11,080,838 | B1 * | 8/2021 | Li | G06V 20/17 |
| 2002/0138351 | A1 * | 9/2002 | Houvener | G06Q 20/347 705/18 |
| 2006/0026017 | A1 * | 2/2006 | Walker | H04L 63/302 701/31.4 |
| 2006/0206246 | A1 * | 9/2006 | Walker | H04L 63/302 701/16 |
| 2007/0079012 | A1 * | 4/2007 | Walker | G06Q 20/32 709/249 |
| 2009/0019552 | A1 * | 1/2009 | McLaughlin | G16H 10/65 705/3 |
| 2009/0024416 | A1 * | 1/2009 | McLaughlin | G16H 10/65 705/2 |
| 2009/0132813 | A1 * | 5/2009 | Schibuk | G06Q 20/40 726/9 |
| 2011/0238451 | A1 * | 9/2011 | Bazzani | G06Q 40/00 705/4 |
| 2012/0109829 | A1 * | 5/2012 | McNeal | G16H 10/65 705/67 |
| 2012/0168506 | A1 * | 7/2012 | Ruehrmair | G06F 21/73 235/454 |
| 2013/0191279 | A1 * | 7/2013 | Calm | G06Q 20/354 705/41 |
| 2013/0297353 | A1 * | 11/2013 | Strange | G06V 30/162 705/4 |
| 2015/0026174 | A1 * | 1/2015 | Nuggehalli | G06F 16/48 707/736 |
| 2016/0132969 | A1 * | 5/2016 | Gunjan | G06Q 40/08 705/4 |
| 2016/0344740 | A1 * | 11/2016 | Choi | H04L 63/107 |
| 2018/0033087 | A1 * | 2/2018 | Delinselle | G06Q 40/08 |
| 2018/0160907 | A1 * | 6/2018 | Verma | A61B 1/233 |
| 2019/0121522 | A1 * | 4/2019 | Davis | H04N 9/3185 |
| 2020/0036528 | A1 * | 1/2020 | Ortiz | H04L 63/123 |
| 2020/0142128 | A1 * | 5/2020 | Baer | G02B 6/1225 |
| 2020/0177730 | A1 * | 6/2020 | Dutta | H04M 7/0027 |
| 2020/0219197 | A1 * | 7/2020 | Fields | G06Q 30/0206 |
| 2020/0265417 | A1 * | 8/2020 | Bruno | G06Q 20/363 |
| 2021/0042830 | A1 * | 2/2021 | Burke | G06Q 30/0631 |
| 2021/0173916 | A1 * | 6/2021 | Ortiz | H04L 9/3226 |
| 2021/0383479 | A1 * | 12/2021 | Syed | G06Q 10/10 |
| 2022/0044329 | A1 * | 2/2022 | Bertagnolli | G06N 3/084 |

OTHER PUBLICATIONS

Artificial Intelligence for Futuristic Banking, IEEE (Year: 2022).*

* cited by examiner

Copyright © 2020 The Travelers Indemnity Company

Copyright © 2020 The Travelers Indemnity Company

Copyright © 2020 The Travelers Indemnity Company

Copyright © 2020 The Travelers Indemnity Company

SYSTEMS AND METHODS FOR MULTIVARIATE ARTIFICIAL INTELLIGENCE (AI) SMART CARDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

There are currently two (2) basic manners in which customer interactions requiring complex decision making may be carried out. First, a customer may conduct live telephone or online chat conversations with a human Customer Service Representative (CSR). These conversations are often enhanced and/or preceded by utilization of an Interactive Voice Response (IVR) system to triage and/or route the customer's query. Unfortunately, as human staffing is an expensive resource, many customers may experience long wait times and/or poor quality of service. Long wait times, in particular, often dissuade customers from becoming involved with the decision-making process and/or delay the process. In cases where timely information is important for result determination, such delays often lead to mistakes and associated economic losses.

In the second manner of customer interactions, advancements in smartphone technology have provided for mobile platforms via which customers may skip human-to-human interactions (and the attendant queues thereof) by submitting queries via mobile applications. While the promise of such a technology-enhanced option was originally high, it has failed to remedy the problems with the query process. Smartphone applications must be coded to provide menus and specific questions to customers so that they may be properly guided through the process, for example. However, even leveraging the best marketing research has failed to generate menus and questions that substantial portions of a customer base find intuitive. Confusion with mobile device applications increases the frequency of incorrect data entry, which, in turn, leads to inaccurate decision-making results. Inaccurate results cause economic errors which do harm to either or both of the customer and the entity to which the customer has submitted a query.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Complex decision-making results based on customer (and/or client or potential customer/client) queries continue to be a bottleneck and a source of error despite leveraging of mobile device applications to reduce queue times for CSR conversations. Accordingly, entities tasked with providing results based on such queries must either increase CSR staffing, which greatly increases costs, or spend large amounts of capital developing new menus and questions for mobile device applications, with no guarantee of success in providing more intuitive and less error-prone interfaces.

In accordance with embodiments herein, these and other deficiencies of previous solutions are remedied by providing systems, apparatus, methods, and articles of manufacture for utilizing multivariate Artificial Intelligence (AI) smart cards. Some embodiments, for example, utilize smart cards to enhance the speed and accuracy of initial or First Notice Of Loss (FNOL) inputs and then leverage multi-tiered AI analysis to automatically process the inputs to generate an accurate and timely result. In some embodiments, the AI analysis may accept a plurality of inputs such as (i) data from and/or based upon received smart card data (e.g., metadata), (ii) customer response language data (e.g., natural spoken and/or written language data), and/or (iii) customer device sensor data (e.g., pictures, video, readings, etc.) and may convert each input into a numeric value. According to some embodiments, the numeric values may be combined (e.g., in accordance with one or more mathematical operations) and evaluated by stored AI logic rules to identify one or more statistically relevant matches with prestored data. In some embodiments, the prestored matches may be utilized to calculate or compute a result for the customer's query (e.g., automatically—without human input into the analysis procedure).

II. Multivariate AI Smart Card Systems

Figure 1:
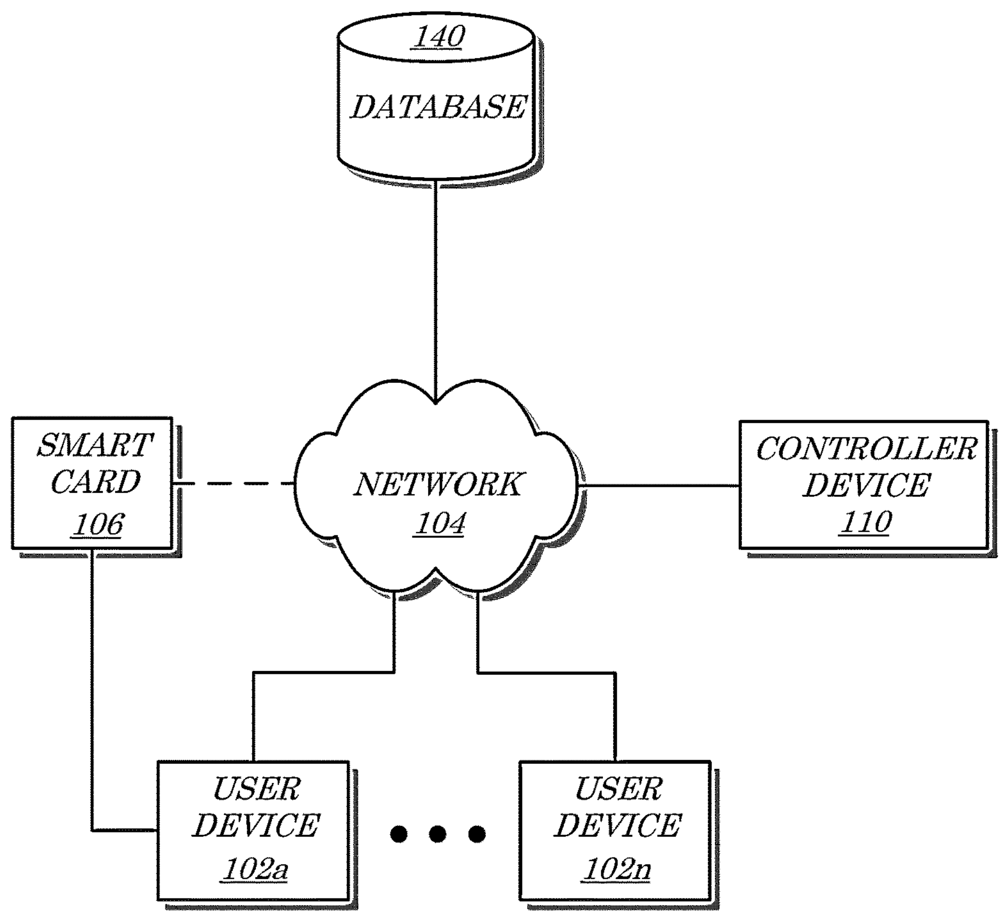
FIG. 1 is a block diagram of a system according to some embodiments.

Referring first to FIG. 1, a block diagram of a system 100 according to some embodiments is shown. In some embodiments, the system 100 may comprise a plurality of user devices 102*a-n*, a network 104, a smart card 106 (e.g., a third-party device), a controller device 110, and/or a database 140. As depicted in FIG. 1, any or all of the devices 102*a-n*, 106, 110, 140 (or any combinations thereof) may be in communication via the network 104. In some embodiments, the system 100 may be utilized to provide for more timely and more accurate complex, multivariate decision-making results for customer (or potential customer) queries. The controller device 110 may, for example, interface with one or more of the user devices 102*a-n* and/or the smart card 106 to retrieve multivariate data (e.g., via a specially structured interface output by each user device 102*a-n*; not separately shown) to process a result for a user-initiated query utilizing multi-step AI logical processing.

Fewer or more components 102*a-n*, 104, 106, 110, 140 and/or various configurations of the depicted components 102*a-n*, 104, 106, 110, 140 may be included in the production environment system 100 without deviating from the scope of embodiments described herein. In some embodiments, the components 102*a-n*, 104, 106, 110, 140 may be similar in configuration and/or functionality to similarly named and/or numbered components as described herein. In some embodiments, the system 100 (and/or portion thereof) may comprise a multivariate AI smart card program, system, and/or platform programmed and/or otherwise configured to execute, conduct, and/or facilitate the methods 400, 500, 600 of FIG. 4, FIG. 5, and/or FIG. 6 herein, and/or portions or combinations thereof.

The user devices 102*a-n*, in some embodiments, may comprise any types or configurations of computing, mobile electronic, network, user, and/or communication devices that are or become known or practicable. The user devices 102*a-n* may, for example, comprise one or more tablet computers, such as an iPad® manufactured by Apple®, Inc. of Cupertino, Calif., and/or cellular and/or wireless telephones or "smart" phones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102*a-n* may comprise devices owned and/or operated by one or more users, such as customers, potential customers, contractors, and/or agents. According to some embodiments, the user devices 102*a-n* may communicate with the controller device 110 via the network 104 to conduct various complex and/or multivariate queries such as underwriting inquiries, e.g., to submit a FNOL and/or resolve a claim of loss, as described herein.

In some embodiments, the user devices 102*a-n* may interface with the controller device 110 to effectuate communications (direct or indirect) with one or more other user devices 102*a-n* (such communication not explicitly shown in FIG. 1) operated by other users, for example. In some embodiments, the user devices 102*a-n* may interface with the smart card 106 to effectuate communications (direct or indirect) with the controller device 110. In some embodiments, the user devices 102*a-n* and/or the smart card 106 may comprise one or more sensors and/or other data acquisition and/or input devices. In some embodiments, input from such devices 102*a-n*, 106 may be provided to the controller device 110 to be utilized as input to a multivariate AI processing routine and/or process to automatically provide a result to the user, as described herein.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the controller device 110, the user devices 102*a-n*, the smart card 106, and/or the database 140. In some embodiments, the network 104 may comprise direct communications links between any or all of the components 102*a-n*, 106, 110, 140 of the system 100. The user devices 102*a-n* may, for example, be directly interfaced or connected to one or more of the controller device 110 and/or the smart card 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102*a-n* may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 106, 110, 140 of the system 100. The network 104 may comprise one or more cellular telephone networks with communication links between the user devices 102*a-n* and the controller device 110, for example, and/or may comprise a BLE, NFC, RF, and/or a "personal" network comprising short-range wireless communications between the user device 102 and the smart card 106, for example.

According to some embodiments, the smart card 106 may comprise any quantity, type, and/or configuration of pre-stored data device and/or object that is or becomes known or practicable. The smart card 106 may comprise, for example, (i) a barcode card comprising a human and/or computer-readable indicia coupled (e.g., printed, etched, emblazoned) thereto, (ii) a magnetic stripe or "mag stripe" card comprising a magnetically-encoded data strip, (iii) an Integrated Circuit (IC) micro-processer card or "chip card" comprising a micro-processing unit (e.g., an eight-bit, sixteen-bit, or thirty-two-bit processor), some amount of Read-Only Memory (ROM), and/or some amount of Random Access Memory (RAM), (iv) an IC memory card comprising larger data storage capacity (e.g., ROM) than an IC micro-processor card, but not having a processing unit, and/or (v) an optical memory card comprising an optically-encoded data portion (e.g., similar to the optical data storage of a Digital Video Disk (DVD)). In some embodiments, the smart card 106 may store information utilizing one or more storage devices and/or mediums (not shown), such as, but not limited to, a solid-state memory device, a magnetic stripe, barcode (e.g., 2-D and/or 3-D barcode; e.g., a 2-D matrix barcode, such as a Quick Response (QR®) code)), RFID tag, and/or other NFC information device that stores identifying and/or descriptive information (e.g., account metadata). According to some embodiments, the smart card 106 may provide access to the stored data via various transmission and/or interrogation methods, such as, but not limited to, a bar code reader, magnetic stripe reader, NFC receiver (or transceiver), Bluetooth® device, and/or other optical, magnetic, passive-inductive, and/or proximity device configured and/or coupled to read information from the smart card 106.

In some embodiments, the smart card 106 may comprise and/or the system 100 may comprise a third-party device (not separately shown) that may itself comprise any type or configuration of a computerized processing device, such as a PC, laptop computer, computer server, database system, and/or other electronic device, devices, or any combination thereof. In some embodiments, such a third-party device may be owned and/or operated by a third-party (i.e., an entity different than any entity owning and/or operating either the user devices 102*a-n* or the controller device 110;

such as a data provider entity). The third-party device may, for example, be owned and/or operated by a data and/or data service provider, such as Dun & Bradstreet® Credibility Corporation of Short Hills, N.J. (and/or a subsidiary thereof, such as Hoovers™), Deloitte® Development, LLC of London, GB, Experian™ Information Solutions, Inc. of Costa Mesa, Calif., EagleView® Technologies, Inc. of Bellevue, Wash., and/or Edmunds.com®, Inc. of Santa Monica, Calif. In some embodiments, the third-party device may supply and/or provide data, such as aerial imagery, Global Positioning System (GPS) data, vehicle diagnostic data, traffic camera images, blueprints, maps, etc., to the controller device 110 and/or the user devices 102*a-n*. In some embodiments, the third-party device may comprise a plurality of devices and/or may be associated with a plurality of third-party entities and/or may be separate from the smart card 106.

In some embodiments, the controller device 110 may comprise an electronic and/or computerized controller device, such as a computer server communicatively coupled to interface with the user devices 102*a-n* and/or the smart card 106 (directly and/or indirectly). The controller device 110 may, for example, comprise one or more PowerEdge™ R830 rack servers manufactured by Dell®, Inc. of Round Rock, Tex., which may include one or more Twelve-Core Intel® Xeon® E5-4640 v4 electronic processing devices. In some embodiments, the controller device 110 may comprise a plurality of processing devices specially programmed to execute and/or conduct processes that are not practicable without the aid of the controller device 110. The controller device 110 may, for example, execute a plurality of AI logic modules that work in concert to process multivariate inputs to calculate and/or compute a result based on a user query/submission, as described herein, such automatic multi-step AI rules-based analysis not being capable of being conducted without the benefit of the specially-programmed controller 110, particularly not within timeframes that prevent excessive queuing and/or delays (e.g., within a matter of hours). According to some embodiments, the controller device 110 may be located remotely from one or more of the user devices 102*a-n* and/or the smart card 106. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more AI, neural network, and/or other programs, modules, and/or routines that facilitate the provision of multivariate query results, e.g., in an online environment, as utilized in various applications, such as, but not limited to, underwriting product claims processes, as described herein. According to some embodiments, the controller device 110 may comprise a computerized processing device, such as a computer server and/or other electronic device to manage and/or facilitate queries and/or communications regarding the user devices 102*a-n*. An insurance company employee, agent, claim handler, underwriter, and/or other user (e.g., customer, contractor, client, or company) may, for example, utilize the controller device 110 to (i) identify customer account metadata (e.g., based on data received from the smart card 106 and/or one or more of the user devices 102*a-n*), (ii) identify natural language data (e.g., based on data received from one or more of the user devices 102*a-n*), (iii) identify sensor data (e.g., based on data received from the smart card 106, a third-party device, and/or one or more of the user devices 102*a-n*), (iv) generate a numeric expression for each of the identified data inputs (e.g., utilizing stored numeric conversion rules), (v) identify one or more relevant historical cases based on an analysis and/or comparison of numeric expressions representing historic data and the generated numeric expressions, (vi) calculate and/or compute a result based on the one or more relevant cases (e.g., an underwriting product claim handling result), and/or (vii) output the result via an interface on the user's mobile device, as described herein.

In some embodiments, the controller device 110 and/or the smart card 106 (and/or the user devices 102*a-n*) may be in communication with the database 140. The database 140 may store, for example, account identification data, preference and/or characteristics data, historic query result data (e.g., claim handling result data), geo-location data, and/or classification data obtained from the user devices 102*a-n*, the smart card 106, historic query result metrics (e.g., statistics) defined by the controller device 110, data defining natural language analysis rules, metadata analysis rules, sensor data analysis rules, and/or query processing rules (e.g., claim handling rules), and/or instructions that cause various devices (e.g., the controller device 110, the smart card 106, and/or the user devices 102*a-n*) to operate in accordance with embodiments described herein. The database 140 may store, for example, one or more batch job files, data transformation scripts, metadata analysis scripts, natural language analysis scripts, sensor data analysis scripts, account identification data, insured object data (e.g., type, capability, and/or location), and/or decision-making data (e.g., thresholds and/or logic). In some embodiments, the database 140 may comprise any type, configuration, and/or quantity of data storage devices that are or become known or practicable. The database 140 may, for example, comprise an array of optical and/or solid-state hard drives configured to store policy and/or location data provided by (and/or requested by) the user devices 102*a-n* and/or smart card 106, metadata analysis data (e.g., smart card identification and/or communication data and/or metadata parsing and/or numeric conversion data), natural language analysis data (e.g., speech-to-text analysis data, keywords and/or phrases), sensor analysis data (e.g., analysis formulas and/or mathematical models descriptive of sensor data parsing, object recognition, object classification, and/or numeric conversion data), and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102*a-n* or the smart card 106 may comprise the database 140 or a portion thereof, for example, and/or the controller device 110 may comprise the database or a portion thereof.

Figure 2:
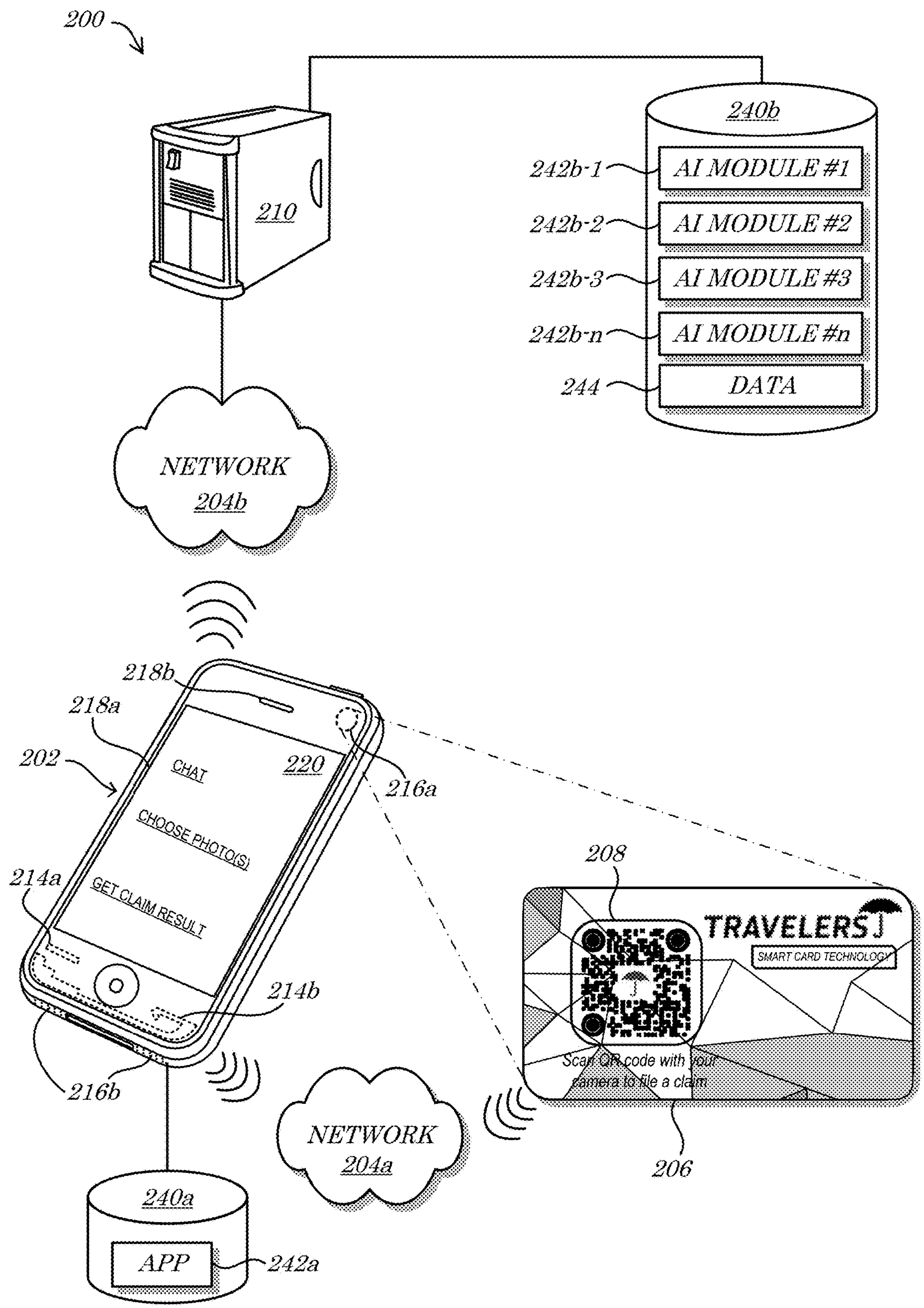
FIG. 2 is a mixed block and perspective diagram of a system according to some embodiments.

Turning to FIG. 2, a mixed block and perspective diagram of a system 200 according to some embodiments, is shown. In some embodiments, the system 200 may comprise a mobile electronic device 202 in communication (e.g., via one or more networks 204*a-b*) with a smart card 206. In some embodiments, the smart card 206 may comprise a stored data indicia 208, e.g., in the form of a two-dimensional or matrix barcode, as depicted in FIG. 2. In some embodiments, the mobile electronic device 202 may utilize a first network 204*a*, such as a short-range wireless network, to communicate with the smart card 206. In some embodiments, the mobile electronic device 202 may communicate via a second network 204*b*, such as a cellular communications network and/or the Internet, with a server 210.

According to some embodiments, the mobile electronic device 202 may comprise one or more communication antennas 214*a-b* (e.g., a first antenna 214*a*, such as a Wi-Fi®, Bluetooth®, and/or other short-range communications antenna, and/or a second antenna 214*b*, such as such as a cellular network or long-range antenna). The first antenna 214*a* may be utilized for communications via the first network 204*a*, for example, and/or the second antenna 214*b* may be utilized for communications via the second network 204*b*. In some embodiments, the mobile electronic device 202 may comprise various input devices 216*a-b*, such as a first input device or camera 216*a* and/or a second input device and/or microphone 216*b*. According to some embodiments, the mobile electronic device 202 may comprise one or more output devices 218*a-b* (e.g., a first output device 218*a*, such as a display screen, and/or a second output device 218*b*, such as a speaker). In some embodiments, one or more components, such as the display screen 218*a*, may comprise both an input device 216*a-b* and an output device 218*a-b*—e.g., the display screen 218*a* may comprise a capacitive and/or touch-capable input/output device. According to some embodiments, the mobile electronic device 202 (and/or the display screen 218*a* thereof) may output a Graphical User Interface (GUI) 220 that provides output from and/or accepts input for the mobile electronic device 202.

In some embodiments, the mobile electronic device 202 may comprise or be in communication with a first memory device 240*a* and/or the server 210 may comprise or be in communication with a second memory device 240*b*. The first memory device 240*a* may store, for example, a first or mobile device application 242*a* and/or the second memory device 240*b* may store a plurality of AI modules 242*b*-1, 242*b*-2, 242*b*-3, 242*b-n* and/or stored data 244. According to some embodiments, the GUI 220 may provide output from and/or accept input for the mobile device application 242*a* executed by the mobile electronic device 202. In some embodiments, the mobile electronic device 202 may conduct communications with the smart card 206 and/or the server 210. The mobile electronic device 202 may, for example, execute the mobile device application 242*a* to generate the interface 220 and/or to activate the camera 216*a* (or other sensor) to capture data descriptive of and/or stored by the smart card 206. As depicted in FIG. 2, for example, the camera 216*a* may be utilized to capture an image of the smart card 206 and/or the stored data indicia 208 thereof, and/or the first network 204*a* may be utilized to transfer data (e.g., indicative of the stored data indicia 208) to the mobile electronic device 202.

According to some embodiments, the mobile electronic device 202 (e.g., via execution of the mobile device application 242*a*) may process and/or transmit any or all data received from (or indicative of, such as data from the camera 216*a*) the smart card 206. Such data may be transmitted from the smart card 206 to the mobile electronic device 202, for example, and the mobile device application 242*a* executed by the mobile electronic device 202 may implement stored rules and/or logic to analyze and/or output the received data by transmitting the received and/or captured data to the server 210 (e.g., via the second network 204*b*). According to some embodiments, data output via the first output device 218*a* (and/or the GUI 220) of the mobile electronic device 202 may be based on and/or triggered by the data received from (and/or indicative of) the smart card 206.

According to some embodiments, the server 210 may execute one or more of the AI modules 242*b*-1, 242*b*-2, 242*b*-3, 242*b-n*, e.g., in response to receiving the data indicative of/from the smart card 206. According to some embodiments, the server 210 and/or the second memory device 240*b* may store fewer or more modules, procedures, and/or programs than are depicted in FIG. 2. In some embodiments, a first AI module 242*b*-1 may comprise and/or define programming logic that is directed to processing, analyzing, and/or converting metadata. The first AI module 242*b*-1 may, for example, define instructions that accept the data indicative of/from the smart card 206 and/or query the stored data 244 as inputs and provide an output comprising a numeric expression descriptive of the analyzed/processed metadata. According to some embodiments, a second AI module 242*b*-2 may comprise and/or define programming logic that is directed to processing, analyzing, and/or converting natural language data. The second AI module 242*b*-2 may comprise, for example, a virtual assistant or "chat" module that accepts natural language (text and/or speech) input form the mobile electronic device 202, processes the input to identify natural language intents and/or responses, and/or provides an output comprising a numeric expression descriptive of the analyzed/processed natural language data (e.g., inputs and/or inferred intents). In some embodiments, a third AI module 242*b*-3 may comprise and/or define programming logic that is directed to processing, analyzing, and/or converting sensor data. The third AI module 242*b*-3 may comprise, for example, an image (and/or other sensor data type) analysis module that accepts image (and/or other sensor data) input form the mobile electronic device 202, processes the input to identify objects described by the image data, and/or provides an output comprising a numeric expression descriptive of the analyzed/processed image (and/or other sensor) data.

In some embodiments, the second memory device 240*b* may store one or more other AI modules 242*b-n*. Such other AI modules 242*b-n* may, for example, comprise and/or define programming logic that is directed to identifying and/or quantifying damage to one or more objects identified based on data received from the mobile electronic device 202 (and/or the smart card 206). Such a module may, for example, utilize data captured by the camera 216*a* (and/or other sensor of the mobile electronic device 202) as input, analyze features within the imagery and/or data (e.g., expected, designed, and/or typical information from the location at a previous time, as compared to actual information from the location at the current time) to identify one or more areas of damage or non-conformity. In some embodiments, such damage information and/or identification may be compared and/or cross-referenced with repair and/or replacement data (e.g., the stored data 244, or a portion thereof) to calculate an expected monetary amount of damage (e.g., loss) for the analyzed location and/or objects.

In some embodiments, the mobile electronic device 202 may comprise a smart mobile phone, such as the iPhone® 8 or a later generation iPhone®, running iOS 10 or a later generation of iOS, supporting Location Services. The iPhone® and iOS are produced by Apple Inc., however, embodiments herein are not limited to any particular portable computing device or smart mobile phone. For example, the mobile electronic device 202 may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable form-factor devices by any vendor containing at least one Central Processing Unit (CPU) and a wireless communication device (e.g., one or more of the communication antennas 214*a-b*).

According to some embodiments, the mobile electronic device 202 runs (i.e., executes) the mobile device software application 242*a* ("app") that causes the generation and/or output of the GUI 220. In some embodiments, the app works with Location Services supported by an iOS operating system executing on the mobile electronic device 202. The app 242*a* may include, comprise, and/or cause the generation of the GUI 220, which may be utilized, for example, for transmitting and/or exchanging data with the smart card 206 and/or the server 210. In some embodiments, once the app 242*a* receives and/or captures data from the smart card 206, the app 242*a* may translate the received data and/or utilize the data to trigger and/or generate one or more images and/or other output provided to a user (not shown) of the mobile electronic device 202.

Fewer or more components 202, 204*a-b*, 206, 208, 210, 214*a-b*, 216*a-b*, 218*a-b*, 220, 240*a-b*, 242*a*, 242*b*-1, 242*b*-2, 242*b*-3, 242*b-n*, 244 and/or various configurations of the depicted components 202, 204*a-b*, 206, 208, 210, 214*a-b*, 216*a-b*, 218*a-b*, 220, 240*a-b*, 242*a*, 242*b*-1, 242*b*-2, 242*b*-3, 242*b*-n, 244 may be included in the system 200 without deviating from the scope of embodiments described herein. In some embodiments, the components 202, 204*a-b*, 206, 208, 210, 214*a-b*, 216*a-b*, 218*a-b*, 220, 240*a-b*, 242*a*, 242*b*-1, 242*b*-2, 242*b*-3, 242*b-n*, 244 may be similar in configuration and/or functionality to similarly named and/or numbered components as described herein. In some embodiments, the system 200 (and/or portions thereof) may comprise a multivariate AI smart card program, system, and/or platform programmed and/or otherwise configured to execute, conduct, and/or facilitate the methods 400, 500, 600 of FIG. 4, FIG. 5, and/or FIG. 6 herein, and/or portions or combinations thereof.

Figure 3A:
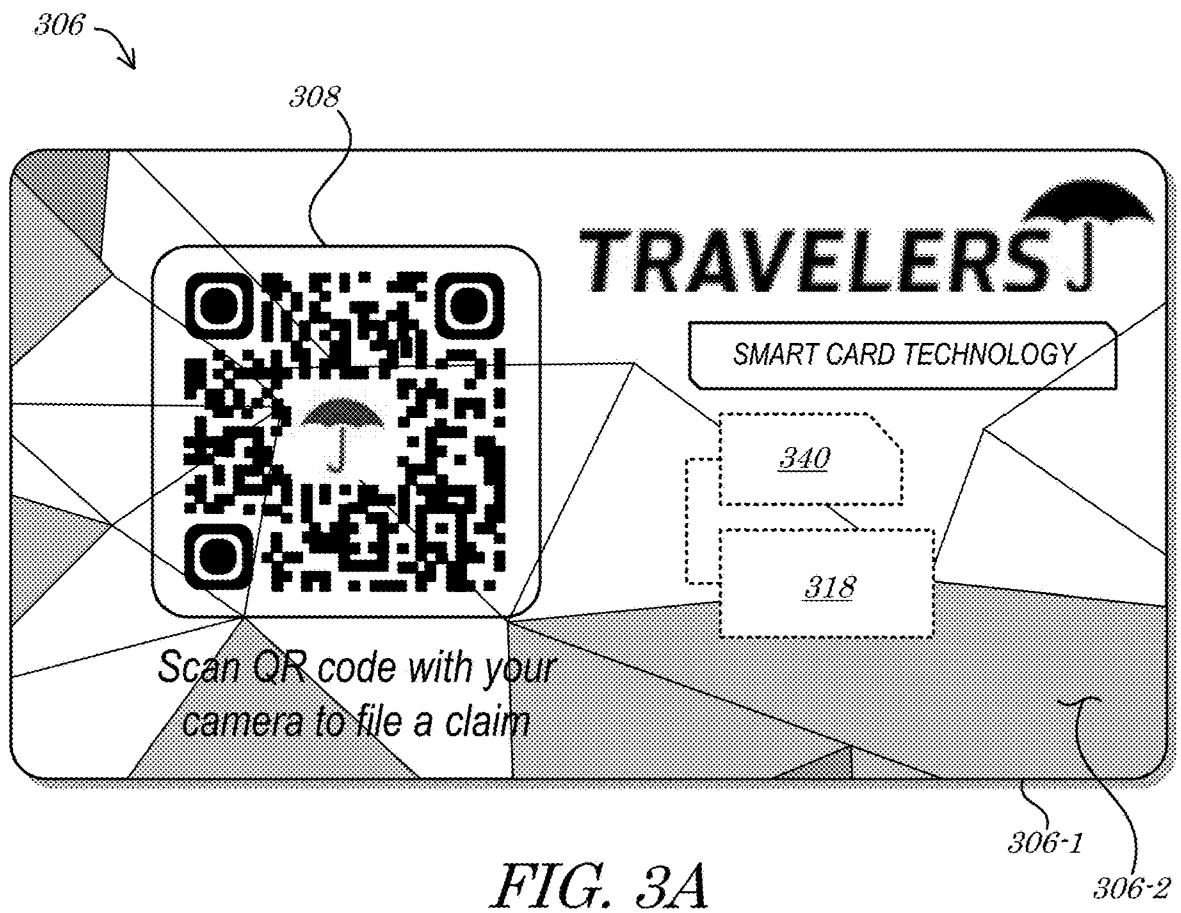
FIG. 3A is diagram of a smart card according to some embodiments.
Figure 3B:
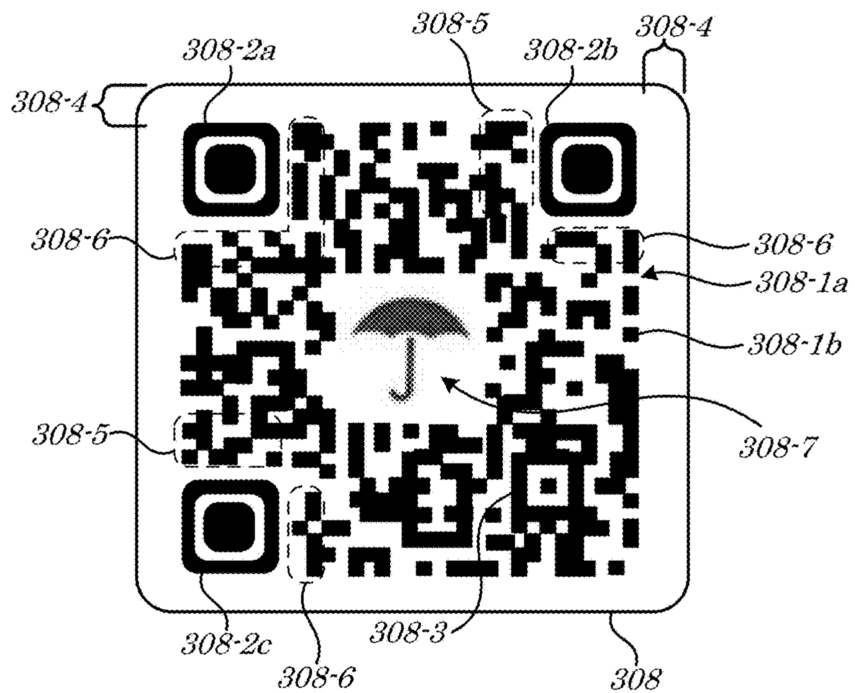
FIG. 3B is diagram of a barcode according to some embodiments.

Turning now to FIG. 3A and FIG. 3B, a diagram of a smart card 306 and diagram of a barcode 308 (and/or other machine-readable indicia) according to some embodiments are shown, respectively. The smart card 306 may, for example, comprise a body 306-1 that is coupled to and/or comprises the barcode 308 that stores information (e.g., metadata and/or identifying information) descriptive of one or more accounts, customers, insured objects, characteristics, settings, and/or other parameters. As depicted, the barcode 308 may comprise a machine-readable optical label, engraving, etching, and/or feature that is descriptive of stored information and that is disposed on a front surface 306-2 of the body 306-1. In some embodiments, the body 306-1 may be constructed of card-stock, paper, metal, carbon-fiber, and/or plastic, e.g., a synthetic plastic polymer such as PolyVinyl Chloride (PVC) and/or a thermoplastic polymer resin, such as PolyEthylene Terephthalate (PET) or PolyEthylene Terephthalate Glycol (PETG). The body 306-1 may, in some embodiments, be generally rectangular-shaped with rounded corners and/or have dimensions approximating standard credit card-sizes, such as eighty-five and six tenths millimeters by fifty-three and ninety-eight hundredths millimeters (85.6 mm×53.98 mm; or 3.370"×2.125") with a thickness of seventy-six hundredths millimeters (0.76 mm; 0.03125").

According to some embodiments, the smart card 306 may also or alternatively comprise an NFC device 318 and/or a memory chip 340. The memory chip 340 may, for example, comprise a 256K (262,144 bits) or 512K (524,288 bits) serial Electrically Erasable and Programmable Read-Only Memory (EEPROM) chip embedded between layers (not shown) of the substrate utilized to construct the body 306-1 of the smart card 306. In some embodiments, the memory chip 306-3 may store the same information as the barcode 308 and/or may store additional information. According to some embodiments, the data stored on the memory chip 340 may be accessible via the NFC device 318. The NFC device 318 may, for example, comprise a micro NFC/RFID transponder, such as an NTAG® 213 IC that operates in accordance with the ISO 14443A "Identification cards—Contactless integrated circuit cards—Proximity cards" standard published by the International Organization for Standardization (ISO) of Geneva, Switzerland (2018), and available from NXP® Semiconductors Netherlands B.V. of Eindhoven, Netherlands. The NFC device 318 may, in some embodiments, comprise a passively activated and/or powered transponder operable to provide stored information (e.g., stored by the NFC device 318 and/or the memory chip 340) wirelessly to an external and proximate device (not shown; e.g., the mobile electronic device 202 of FIG. 2 herein).

In some embodiments, such as in the case that the barcode 308 is utilized, and referring specifically to FIG. 3B for greater detail, the barcode 308 may store account data and/or metadata via a plurality of encoded and/or arranged black squares 308-1*a* in a square grid on a white background 308*a*-1*b*. Such encoded data can be read by an imaging device (not shown) and processed using known Reed-Solomon error correction techniques to decode the stored data. In operation, a matrix barcode, such as the example barcode 308 shown in FIG. 3A may be imaged by a 2-dimensional imaging sensor and then digitally processed by an electronic device. The processing may generally comprise an identification and/or location of three positioning symbols (e.g., embedded squares) 308-2*a*, 308-2*b*, 208-2*c* disposed proximate to three corners of the barcode 308 image, with image alignment and normalization being confirmed utilizing an alignment symbol (e.g., a smaller embedded square) 308-3 proximate to a fourth corner of the barcode 308 image. In some embodiments, the black squares 308-1*a* encoding the data may be converted to binary numbers and validated with an error-correcting algorithm (e.g., a Reed-Solomon algorithm) in accordance with the ISO/IEC 18004:2015 "Information—Automatic identification and data capture techniques—QR Code barcode symbology" specification published by the ISO (2015).

According to some embodiments, the barcode 308 may comprise any type and/or configuration of machine-readable indicia, such as a Version 40 (177×177) QR® code storing up to one thousand eight hundred and fifty-two (1,852) characters of ASCII text and/or a Version 4 (33×33) QR® code as depicted in FIG. 3A, and capable of storing up to fifty (50) characters of data. In some embodiments, the barcode 308 may comprise special regions of data that are utilized to effect operational decoding of the stored data. The barcode 308 may comprise, for example, a "quiet zone" 308-4 that provides an optical imaging buffer between the stored data and an external visual elements, encoded version information areas 308-5 that store decoding version information, and/or formatting areas 308-6 that store data descriptive of the format of the stored data. According to some embodiments, the barcode 308 may also or alternatively comprise a logo 308-7 or other artwork, images, text, and/or non-data features to distinguish the barcode 308 from those utilized by other entities. In the case of the logo 308-7 depicted in FIG. 3B, for example, the design of the barcode 308 may be centered upon the logo 308-7, while the layout and visual depiction of the stored data (e.g., via the black squares 308-1*a*) and decoding elements 308-2*a*, 308-2*b*, 308-2*c*, 308-3, 308-4, 308-5, 308-6 may change depending upon the type of barcode 308 chosen for the smart card 306 and based on the specific data stored thereon.

Fewer or more components 306-1, 306-2, 308-1*a*, 308-1*b*, 308-2*a*, 308-2*b*, 308-2*c*, 308-3, 308-4, 308-5, 308-6, 308-7, 318, 340 and/or various configurations of the depicted components 306-1, 306-2, 308-1*a*, 308-1*b*, 308-2*a*, 308-2*b*, 308-2*c*, 308-3, 308-4, 308-5, 308-6, 308-7, 318, 340 may be included in the smart card 306 without deviating from the scope of embodiments described herein. In some embodiments, the components 306-1, 306-2, 308-1*a*, 308-1*b*, 308-2*a*, 308-2*b*, 308-2*c*, 308-3, 308-4, 308-5, 308-6, 308-7, 318, 340 may be similar in configuration and/or functionality to similarly named and/or numbered components as described herein. In some embodiments, the smart card 306 (and/or portions thereof) may comprise a multivariate AI smart card program, system, and/or platform programmed and/or otherwise configured to execute, conduct, and/or facilitate the methods 400, 500, 600 of FIG. 4, FIG. 5, and/or FIG. 6 herein, and/or portions or combinations thereof.

III. Multivariate AI Smart Card Methods

Figure 4:
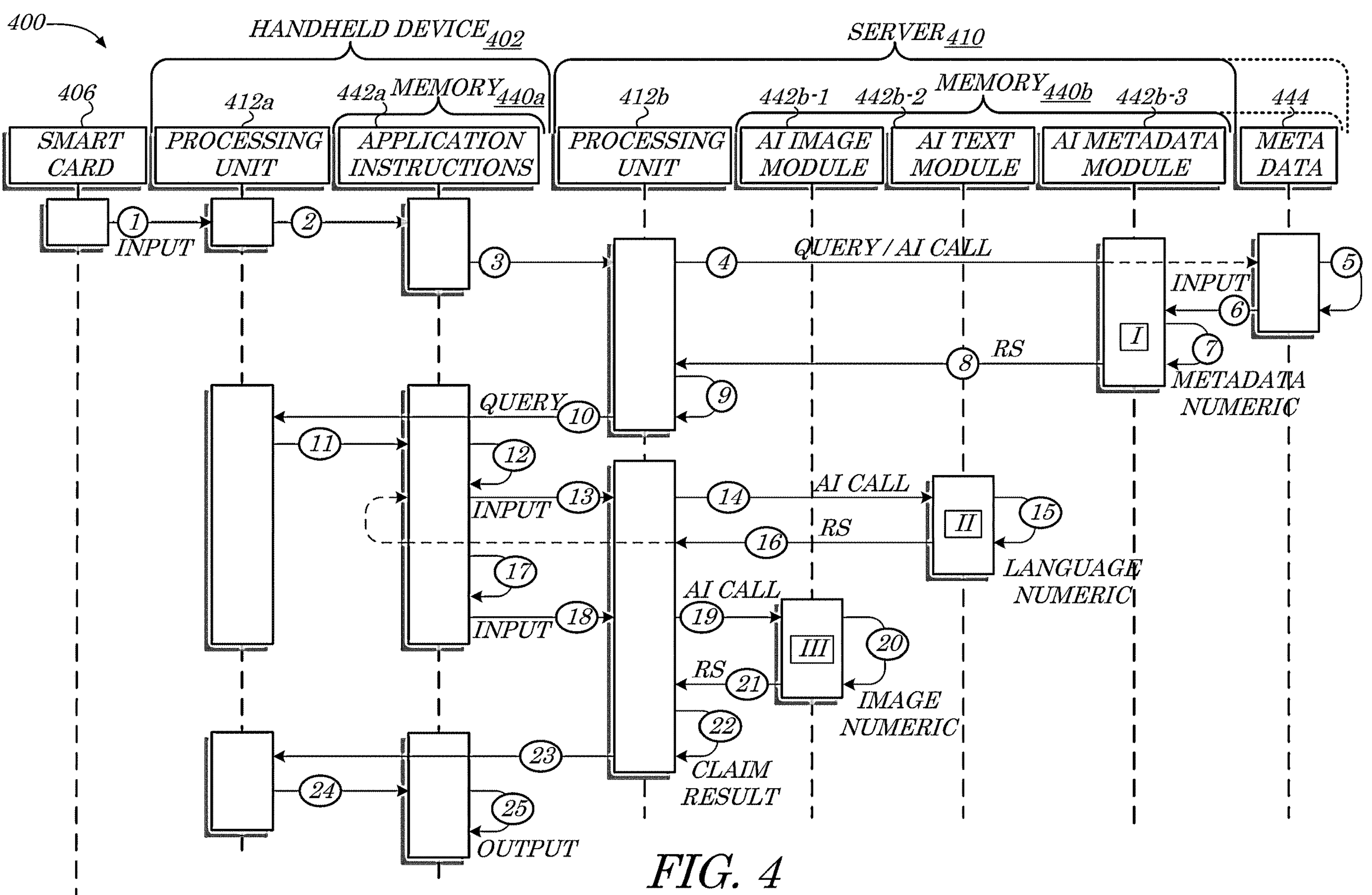
FIG. 4 is a systemic flow diagram of a method according to some embodiments.

Referring to FIG. 4, a systemic flow diagram of a method or process 400 according to some embodiments is shown. In some embodiments, the process 400 may comprise and/or define a method for multivariate AI smart card decision-making result generation (e.g., based on user/customer queries/input). The process 400 may, for example, be executed by various hardware and/or logical components via interactive communications, which may involve communications between any or all of a handheld device 402, a smart card 406, and/or a server 410. According to some embodiments, the handheld device 402 may comprise a first processing unit 412*a* and/or the server 410 may comprise a second processing unit 412*b*. In some embodiments, the handheld device 402 may comprise and/or be in communication with a first memory 440*a* and/or the server 410 may comprise and/or be in communication with a second memory 440*b*. The first memory 440*a* of the handheld device 402 may store, for example, application instructions 442*a*. According to some embodiments, the second memory 440*b* of the server 410 may store an AI image module 442*b*-1, an AI text module 442*b*-2, and/or an AI metadata module 442*b*-3. In some embodiments, the second memory 440*b* and/or the server 410 may comprise and/or store metadata 444 and/or the metadata 444 (or a portion thereof) may reside externally to the server 410 (e.g., on one or more third-party devices; not shown).

In some embodiments, the process 400 (e.g., for multivariate AI smart card decision-making result generation based on user/customer queries/input) may comprise providing first input by the smart card 406 to the handheld device 402 (and/or the first processing device 412*a* thereof), at "1". The handheld device 402 may query or interrogate the smart card 406 to retrieve the first input, for example, and/or may utilize a sensor (not shown), such as a camera, to acquire the first input, e.g., as described herein. In some embodiments, the smart card 406 may comprise NFC, RFID, and/or other short-range network or wireless communications capability that is utilized to transmit and/or pass the first input (such as account identification information) to the handheld device 402. According to some embodiments, the first processing device 412*a* may pass the first input to and/or initialize the application instructions 442*a*, at "2". According to some embodiments, the application instructions 442*a* may identify a communication address of the server 410, e.g., based on the first input from the smart card 406. The transmitting at "3" may, in some embodiments, result from an automatic activation of a hard-coded network address or remote identifier of the server 410 embedded within and/or accessible to the application instructions 442*a*. In some embodiments, the application instructions 442*a* may pass the first input to, call, and/or query the sever 410 (and/or the second processing unit 412*b* thereof), at "3". In some embodiments, the application instructions 442*a* may edit and/or append data to the first input (e.g., data descriptive of the handheld device 402 and/or user/customer query data, such as claim handling data) prior to transmitting to the server 410.

In some embodiments, the second processing unit 412*b* may utilize the receipt of the first input to trigger a call (e.g., a first AI call), query, and/or or initiation of the AI metadata module 442*b*-3, at "4". According to some embodiments, as shown by the dotted line from "4" in FIG. 4, the first input may also or alternatively be utilized to initiate a query to the metadata 444. The metadata 444 may comprise, for example, data stored in relation to data elements received as part of the first input, e.g., an account, object, electronic device, and/or location identifier. The metadata 444 may be queried utilizing such relations to identify a portion or subset of related metadata, at "5". According to some embodiments, the identified portion/subset of metadata and/or the first input may be passed as first AI input to the AI metadata module 442*b*-3, at "6".

According to some embodiments, the AI metadata module 442*b*-3 may execute stored AI instructions to process, analyze, and/or evaluate the subset of the metadata and/or the first input, at "7". The AI metadata module 442*b*-3 may, for example, compare the first input and/or the subset of the metadata to stored data (not separately shown) descriptive of other user/customer queries, accounts, losses, claims, etc., e.g., to identify similarities between previous queries and the current user/customer query. According to some embodiments, values for various parameters of the first input and/or the subset of the metadata may be compared to other stored values for the same parameters (but for different users/customers and/or events) and may be identified as similar in the case that the values are within a predetermined threshold value range of each other. In some embodiments, the first input and/or the subset of the metadata may be processed utilizing stored rules defined and/or executed by the AI metadata module 442*b*-3 to generate, define, calculate, and/or otherwise compute a first or metadata numeric value representative of the first input/subset of the metadata, e.g., a first AI output "I". According to some embodiments, the first AI output "I" may also or alternatively comprise multi-factor authentication data, such as a security question and/or code that may be based on the first input and/or the subset of the metadata. In some embodiments, the first AI output "I" may also or alternatively comprise the subset of the metadata or a portion thereof.

In some embodiments, the AI metadata module 442*b*-3 may pass or transmit the first AI output "I" to the second processing unit 412*b*, at "8". The transmission at "8" may, for example, comprise a response ("RS") to the provision of the first input at "4". According to some embodiments, the second processing unit 412*b* may utilize the first AI output "I" to identify and/or generate a query, such as a multi-factor authentication challenge question, based on the subset of the metadata, etc., at "9". In some embodiments, the server 410 (and/or the second processing unit 412*b* thereof) may transmit the query/challenge to the handheld device 402 (and/or the first processing unit 412*a* thereof), at "10". In the case that the server 410 is in communication with the handheld device 402 via the Internet and/or a cellular telephone network, for example, the server 410 may generate a packet-based communication signal that conveys the generated query/challenge to the handheld device 402.

In some embodiments, the first processing unit 412*a* of the handheld device 402 may utilize the first AI output "I" to trigger and/or activate the application instructions 442*a*, at "11". The application instructions 442*a* may, for example, output (e.g., via a GUI; not separately shown) an indication of the first AI output "I", such as a multi-factor authentication challenge, security question, policy question, etc., and/or otherwise query the user, at "12". According to some embodiments, the user may provide input to the handheld device 402, e.g., in response to the outputting of the first AI output "I", and the application instructions 442*a* may transmit or forward such second input to the server 410 (and/or the second processing device 412*b* thereof), at "13". In some embodiments, such as in the case that the application instructions 442*a* output a query to the user, the second input may comprise a natural language response to the query. The natural language response may, for example, comprise text, audio, video, and/or other natural language and/or communicative information conveyed by the user.

In some embodiments, the second processing unit 412*b* of the server 410 may utilize the receipt of the second input to trigger a call (e.g., a second AI call), query, and/or or initiation of the AI text module 442*b*-2, at "14". According to some embodiments, the second input may be passed as second AI input to the AI text module 442*b*-2. In some embodiments, the AI text module 442*b*-2 may execute stored AI instructions to process, analyze, and/or evaluate the second input, at "15". The AI text module 442*b*-2 may, for example, compare the second input (e.g., a natural language response) to stored data (not separately shown) descriptive of natural language intent mappings to identify similarities between prestored intent mappings and the current user/customer input/response. In some embodiments, the compared and/or identified mappings may be utilized to formulate one or more natural language responses or queries to be sent to the user, defining an automated and interactive AI chat session with the user.

According to some embodiments, values for various parameters of the second input (e.g., ASCII identifiers, word identifiers, phrase identifiers) may be compared to other stored values for the same parameters (but for different users/customers and/or events) and may be identified as similar in the case that the values are within a predetermined threshold value range of each other. In some embodiments, the second input may be processed utilizing stored rules defined and/or executed by the AI text module 442*b*-2 to generate, define, calculate, and/or otherwise compute a second or natural language numeric value representative of the second input, e.g., a second AI output "II". According to some embodiments, the second AI output "II" may also or alternatively comprise one or more natural language responses formulated by the AI text module 442*b*-2.

In some embodiments, the AI text module 442*b*-2 may pass or transmit the second AI output "II" to the second processing unit 412*b*, at "16". The transmission at "16" may, for example, comprise a response ("RS") to the provision of the second input at "14". According to some embodiments, and as identified by the dotted feedback loop line in FIG. 4, the second processing unit 412*b* may utilize the second AI output "II" to identify and/or generate a query that is passed on to the handheld device 402 (and/or the application instructions 442*a* thereof) and the user may provide additional natural language input that is sent back to the server 410 at "13", e.g., in furtherance of the automated and interactive AI chat session with the user.

According to some embodiments, the application instructions 442*a* may output (e.g., via the GUI) an indication of the second AI output "II", such as a request to provide and/or capture an image (and/or other sensor data of the handheld device 402) and/or otherwise query the user, at "17". According to some embodiments, the user may provide input to the handheld device 402, e.g., in response to the outputting of the second AI output "II", and the application instructions 442*a* may transmit or forward such third input to the server 410 (and/or the second processing device 412*b* thereof), at "18". In some embodiments, such as in the case that the application instructions 442*a* output an image request and/or sensor data query to the user, the third input may comprise one or more images, audio, video, and/or other sensor data readings and/or depictions.

In some embodiments, the second processing unit 412*b* of the server 410 may utilize the receipt of the third input to trigger a call (e.g., a third AI call), query, and/or or initiation of the AI image module 442*b*-1, at "19". According to some embodiments, the third input may be passed as third AI input to the AI image module 442*b*-1. In some embodiments, the AI image module 442*b*-1 may execute stored AI instructions to process, analyze, and/or evaluate the third input, at "20". The AI image module 442*b*-1 may, for example, compare the third input (e.g., image and/or other sensor data) to stored data (not separately shown) descriptive of object images and/or characteristics (e.g., visual and/or other sensor characteristics) to identify similarities between prestored object data and the captured image data. In some embodiments, the comparison may be utilized to identify objects and/or other features within and/or described by the third input and/or compare such objects and/or features to objects and/or features for other accounts, customers, and/or events.

According to some embodiments, values for various parameters of the third input (e.g., identified object types, sizes, temperature, color, conditions, and/or other characteristics) may be compared to other stored values for the same parameters (but for different users/customers and/or events) and may be identified as similar in the case that the values are within a predetermined threshold value range of each other. In some embodiments, the third input may be processed utilizing stored rules defined and/or executed by the AI image module 442*b*-1 to generate, define, calculate, and/or otherwise compute a third or image numeric value representative of the third input, e.g., a third AI output "III".

In some embodiments, the AI image module 442*b*-1 may pass or transmit the third AI output "III" to the second processing unit 412*b*, at "21". The transmission at "21" may, for example, comprise a response ("RS") to the provision of the third input at "19". According to some embodiments, the second processing unit 412*b* may utilize the first AI output "I", the second AI output "II", and/or the third AI output "III" to generate, calculate, and/or otherwise compute a query result (e.g., a claim handling determination or result in the case of a claim of loss query), at "22". The second processing unit 412*b* may, for example, execute a claim handling module (not shown) that defines automated AI-based claim handling instructions. According to some embodiments, the instructions may utilize the first, second, and/or third numeric values generate by the AI modules

442*b*-1, 442*b*-2, 442*b*-3 to identify one or more numerically similar previous claim handling (or other query) determinations and calculate and/or compute the current result based on the previous result(s) from any identified similar matters. In some embodiments, the similarity of previous matters may be identified based upon a mathematical comparison of each of the first, second, and third numeric values to values stored in relation to corresponding variables and/or parameters. In some embodiments, the three values may be mathematically combined (e.g., concatenated, aggregated, summed, averaged, etc.) to define a single numeric expression that is compared to corresponding single numeric expressions for each of a plurality of previous matters. In the case that the mathematical difference (simple, absolute, and/or based on one or more formulas and/or models) between the current single numeric expression and a previously recorded matter's numeric expression is within a predefined threshold, similarity may be defined.

According to some embodiments, the server 410 (and/or the second processing unit 412*b* thereof) may transmit the query/claim result to the handheld device 402 (and/or the first processing unit 412*a* thereof), at "23". In the case that the server 410 is in communication with the handheld device 402 via the Internet and/or a cellular telephone network, for example, the server 410 may generate a packet-based communication signal that conveys the generated result to the handheld device 402. In some embodiments, the first processing unit 412*a* of the handheld device 402 may utilize the receipt of the result to trigger and/or activate the application instructions 442*a*, at "24". The application instructions 442*a* may, for example, output (e.g., via the GUI) an indication of the query/claim result, at "25". In such a manner, for example, the user may utilize the smart card 406 to quickly and easily provide error-free information to the server 410, e.g., in combination with user inputs (e.g., natural language and/or image/sensor data) to obtain an automated query/claim result.

Figure 5:
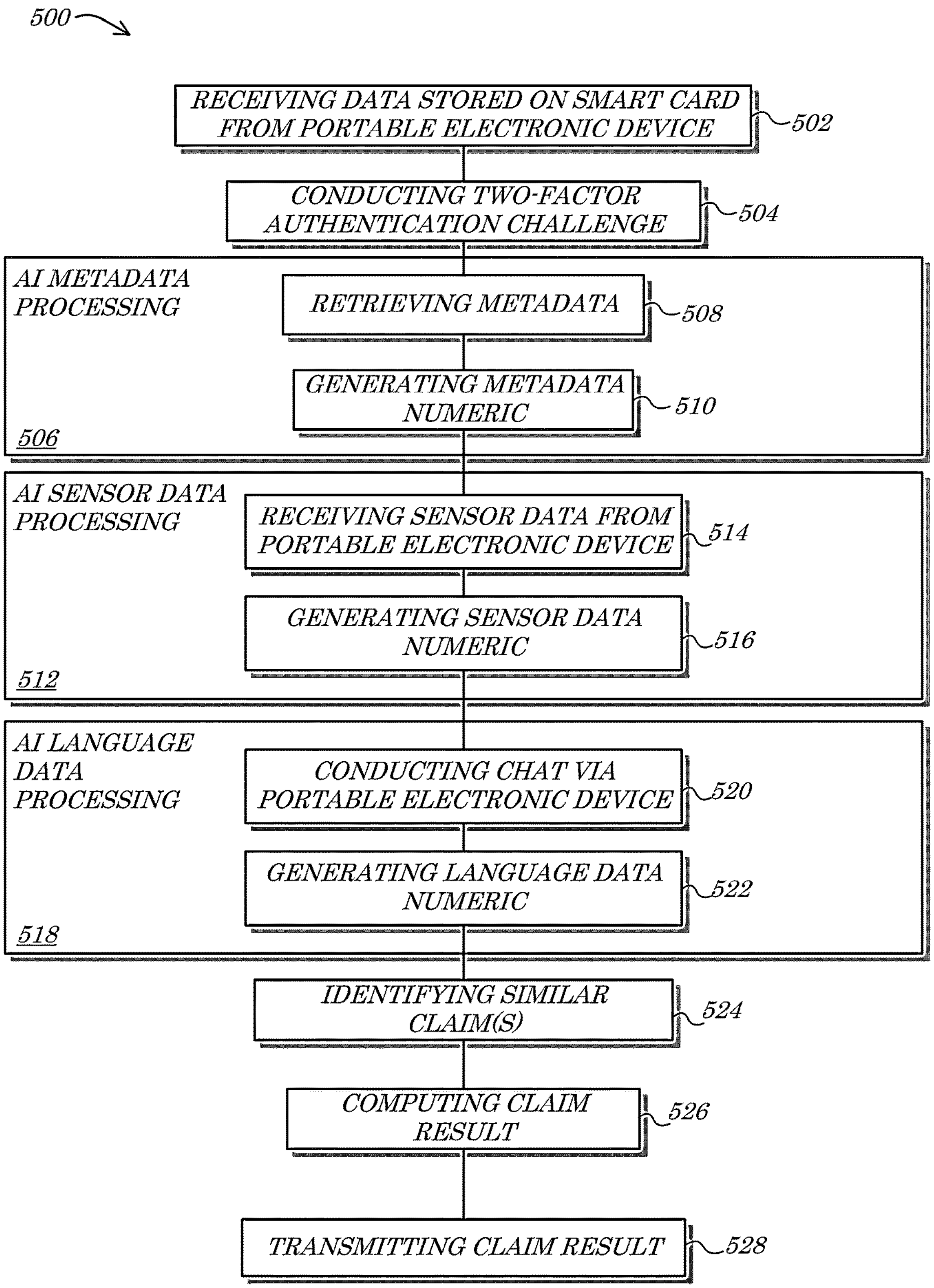
FIG. 5 is a flow diagram of a method according to some embodiments.

Turning now to FIG. 5, a flow diagram of a method 500 according to some embodiments is shown. In some embodiments, the method 500 may be performed and/or implemented by and/or otherwise associated with one or more specialized and/or specially-programmed computers (e.g., one or more of the user devices 102*a-n*, mobile electronic device 202, handheld device 402, the controller device 110, the servers 210, 410, the smart cards 106, 206 306, 406, and/or the apparatus 810 of FIG. 1, FIG. 2, FIG. 3, FIG. 4, and/or FIG. 8 herein), computer terminals, computer servers, computer systems and/or networks, and/or any combinations thereof (e.g., by one or more multi-threaded and/or multi-core processing units of a multivariate AI smart card data processing system). In some embodiments, the method 500 may be embodied in, facilitated by, and/or otherwise associated with various input mechanisms and/or interfaces (such as the interfaces 220, 720*a-d*, 820 of FIG. 2, FIG. 7A, FIG. 7B, FIG. 7C, FIG. 7D, and/or FIG. 8 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240*a-b*, 340, 440*a-b*, 840, 940*a-e* of FIG. 1, FIG. 2, FIG. 3, FIG. 4, FIG. 8, FIG. 9A, FIG. 9B, FIG. 9C, FIG. 9D, and/or FIG. 9E herein) may store thereon instructions that when executed by a machine (such as a computerized processor) result in performance according to any one or more of the embodiments described herein.

In some embodiments, the method 500 may comprise receiving (e.g., by an electronic processing device, from a mobile application of a mobile electronic device of an insured party/user, as an initiation of a process to submit a current insurance claim, and/or via a wireless electronic network) data stored on a smart card from a mobile (e.g., portable) electronic device (e.g., via an electronic communications network and/or by an electronic processing device), at 502. According to some embodiments, the smart card data may be obtained from an indication of computer-readable data stored on the smart card. The smart card may comprise a barcode (e.g., a matrix barcode) that is scanned and/or captured or otherwise read by the mobile electronic device, for example, with the content of the barcode being descriptive and/or indicative of the stored data. According to some embodiments, the mobile electronic device may forward, provide, and/or transmit the stored data (e.g., an indication thereof) to a server of an AI system, as described herein. In some embodiments, the smart card data may be obtained from a memory device of the smart card such as via an NFC/RFID device in communication with the smart card memory device. The mobile electronic device may, for example, interrogate the smart card via one or more NFC/RFID signals and/or fields to obtain the stored data. According to some embodiments, the smart card data may comprise data descriptive of and/or identifying an account (e.g., an insurance and/or underwriting account), a customer or other user, an address of the user, an insured object (e.g., an object identifier such as a Vehicle Identification Number (VIN)), an environmental condition (e.g., temperature), time, location, query/claim (e.g., description and/or identifier), etc. In some embodiments, the smart card data may comprise and/or be considered metadata descriptive of and/or related to a query/claim of the user of the mobile electronic device. According to some embodiments, the smart card may provide and/or transmit the stored data directly to the server without requiring the mobile electronic device.

In some embodiments, the method 500 may comprise conducting (e.g., by the electronic processing device) a two-factor authentication challenge, at 504. In response to the receiving of the smart card data, for example, the electronic processing device may query a database or other data store to identify a particular two-factor (or multi-factor) authentication challenge (and/or other data, such as metadata). Utilizing the data stored on the smart card (and/or data related thereto), for example, a multi-factor communication address and/or challenge, such as a security question (e.g., account metadata), may be retrieved and/or generated. A communication address of the user, such as an e-mail address, phone number, etc., may, in some embodiments, be looked up. According to some embodiments, the address may comprise an address different from and/or dissociated with the mobile electronic device. In some embodiments, such as in response to the identifying of the two-factor authentication challenge, the two-factor authentication challenge may be transmitted to the identified communication address of the user (e.g., to the mobile electronic device and/or to a different device associated with the address). According to some embodiments, an indication of a response and/or answer to the two-factor authentication challenge may be received by the electronic processing device (e.g., from the mobile electronic device and/or from a different device associated with the address). The answer may comprise, for example, a code, a voice imprint, a facial image, a finger/thumbprint impression, etc. In some embodiments, such as in response to the receiving of the answer to the challenge, the electronic processing device may authenticate the answer. The answer may be compared, for example, to pre-stored and/or specially generated data (e.g., metadata and/or a specially generated passcode) to identify a match. In the case that the answer matches the pre-stored/generated data, the identity and/or authorization of the user may be inferred. In the case that the answer does not match, an additional challenge may be transmitted and/or communications with the user may be terminated.

According to some embodiments, the method 500 may comprise conducting (e.g., by the electronic processing device) AI metadata processing, at 506. Metadata stored in relation to the smart card data and/or comprising the smart card data (or a portion thereof) may, for example, be processed in accordance with pre-stored AI instructions such as may define a claim similarity AI model (or a first portion thereof, such as a first AI module), e.g., stored by a non-transitory computer-readable memory device in communication with the electronic processing device. In some embodiments, the method 500 and/or the AI metadata processing at 506 may comprise retrieving the metadata, at 508. The metadata may be stored in relation to the smart card data or a portion thereof, for example, and may be retrieved by querying a database storing the metadata by utilizing the smart card data (or a portion thereof) as query input. According to some embodiments, the method 500 and/or the AI metadata processing at 506 may comprise generating a metadata numeric, at 510. Either or both of the smart card data and any retrieved metadata related thereto may, for example, be processed via the first AI module to define a first or metadata numeric expression. In some embodiments, the execution of the claim similarity AI model by the electronic processing device may convert the data stored on the smart card and/or the related metadata into a first number or first set of numbers. The first AI module may, for example, apply a first mathematical model to the smart card/metadata that utilizes the smart card/metadata as input and generates (e.g., in response to receiving the input) one or more numeric expressions, such as a single number, a series of numbers, and/or a matrix of numbers.

In some embodiments, the method 500 may comprise conducting (e.g., by the electronic processing device) AI sensor data processing, at 512. Sensor data stored on and/or obtained by the mobile electronic device (and/or the smart card) may, for example, be processed in accordance with pre-stored AI instructions such as may define the claim similarity AI model (or a second portion thereof, such as a second AI module) and/or a claim severity AI model (e.g., a third AI module), e.g., stored by the non-transitory computer-readable memory device in communication with the electronic processing device. According to some embodiments, the method 500 and/or the AI sensor data processing at 512 may comprise receiving the sensor data from the portable electronic device, at 514. An indication of sensor data obtained by the mobile electronic device may, for example, be sent by the mobile electronic device to the server in response to a request for the data. As described herein, for example, the electronic processing device may request that the user provide the sensor data to supplement the initial query/claim and/or description thereof. In some embodiments, the sensor data may comprise one or more images, IR readings, location readings, temperature readings, accelerometer readings, light readings, sound readings and/or recordings, etc. The mobile electronic device (and/or the smart card) may comprise, for example, a camera, home automation and/or security system, and/or other sensor that is triggered and/or utilized to capture the sensor data. In some embodiments, the method 500 and/or the AI sensor data processing at 512 may comprise generating a sensor data numeric, at 516. Any or all sensor data may, for example, be processed via the first AI module to define a second or sensor data numeric expression. In some embodiments, the execution of the claim similarity AI model (and/or the claim severity AI model) by the electronic processing device may convert the sensor data into a second number or second set of numbers. The second and/or third AI modules may, for example, apply a second and/or third mathematical model to the sensor data that utilizes the sensor data as input and generates (e.g., in response to receiving the input) one or more numeric expressions, such as a single number, a series of numbers, and/or a matrix of numbers. In some embodiments, the second and/or third AI modules may comprise one or more image and/or data analysis modules comprising programming logic that searches the sensor data/imagery for shapes, colors, patterns, and/or other features or objects. According to some embodiments, the second and/or third AI modules may utilize one or more shape and/or pattern identification algorithms to identify areas within the sensor data/imagery that match stored shapes/patterns indicative of various architectural, structural, natural, and/or other objects. Once identified, such objects may, in some embodiments, be utilized to define the second numeric expression.

According to some embodiments, the method 500 may comprise conducting (e.g., by the electronic processing device) AI language data processing, at 518. Language data stored on and/or obtained by the mobile electronic device (and/or the smart card) may, for example, be processed in accordance with pre-stored AI instructions such as may define the claim similarity AI model (or a third portion thereof, such as a fourth AI module) and/or the claim severity AI model (e.g., the third AI module), e.g., stored by the non-transitory computer-readable memory device in communication with the electronic processing device. In some embodiments, the method 500 and/or the AI language data processing at 518 may comprise conducting a chat via the portable electronic device, at 520. An indication of language data obtained by the mobile electronic device may, for example, be sent by the mobile electronic device to the server in response to a request for the data (e.g., a chat initialization). As described herein, for example, the electronic processing device may send an introductory chat message to the user to initiate an automated AI chat session. An execution of the AI chat module by the electronic processing device utilizing the data stored on the smart card (and/or related metadata) may, for example, cause a generation of at least one chat query. According to some embodiments, a mobile application (e.g., a chat application) of the mobile electronic device may provide an indication of a chat response from the user, e.g., in response to the generated at least one chat query. In some embodiments, the response may comprise language data (e.g., natural language data), such as one or more words, sentences, icons (e.g., emoji), audio, video, etc. According to some embodiments, the method 500 and/or the AI language data processing at 518 may comprise generating a language data numeric, at 522. Any or all language data may, for example, be processed via the third and/or fourth AI modules to define a third or language data numeric expression. In some embodiments, the execution of the claim similarity AI model (and/or the claim severity AI model) by the electronic processing device may convert the language data into a third number or third set of numbers. The third and/or fourth AI modules may, for example, apply a third and/or fourth mathematical model to the language data that utilizes the language data as input and generates (e.g., in response to receiving the input) one or more numeric expressions, such as a single number, a series of numbers, and/or a matrix of numbers.

In some embodiments, the method 500 may comprise identifying (e.g., by the electronic processing device) one or more similar queries and/or claims, at 524. The server of the AI system may, for example, conduct one or more comparisons between data (e.g., metadata, sensor data, and/or language data) descriptive of the user's query/claim and data stored with respect to previous queries/claims. According to some embodiments, first, second, and/or third numbers (and/or sets of numbers) generated from and/or descriptive of the smart card/metadata, sensor data, and/or natural language data may be compared to numbers stored with respect to smart card/metadata, sensor data, and/or natural language data of previous queries/claims. In some embodiments, the three numbers/sets of numbers may be combined (e.g., mathematically) to form a single combined number or set of numbers representative of the current query/claim, and this single number/set of numbers may be compared to single numbers/sets of numbers stored with respect to previous queries/claims. According to some embodiments, different numbers and/or digits representing different aspects of the various data elements may be weighted by the AI models when generating the numbers and/or during the comparison process. In such a manner, for example, different aspects of the smart card/metadata, sensor data, and/or natural language data may be given higher priority when identifying similarities with previous queries/claims. In some embodiments, one or more previous queries/claims may be identified as similar based upon a mathematical comparison of the numbers. In the case that one or more compared numbers are within a predetermined mathematical confidence threshold, for example, an identification of a similarity may occur.

According to some embodiments, the method 500 may comprise computing (e.g., by the electronic processing device) a query/claim result, at 526. In some embodiments, the result may be based upon one or more results from at least one of the previous queries/claims identified as being similar to the current query/claim. An execution of a claim pricing AI model (e.g., a fifth AI module) by the electronic processing device and utilizing claim payment data stored with respect to the at least one previous insurance claim may, for example, define a resolution for the current query and/or insurance claim. According to some embodiments, the result may be based upon a known result from the at least one previous similar query/claim and based on a degree of similarity between the current query/claim and the at least one previous similar query/claim. In the case that the similarity meets a first threshold of similarity (e.g., a first statistical and/or confidence threshold) the result may comprise a first mathematical variant (e.g., eighty percent (80%)) of the previous result, for example, while in the case that the similarity meets a second threshold of similarity (e.g., a second statistical and/or confidence threshold) the result may comprise a second mathematical variant (e.g., one hundred percent (100%)) of the previous result.

In some embodiments, the method 500 may also or alternatively comprise computing (e.g., by the electronic processing device) a cause of loss (e.g., in the case that the user query comprises a submission of an insurance claim) and/or a likelihood of the query/claim being fraudulent. The AI system may comprise a cause of loss AI model (e.g., a sixth AI module), for example, that conducts a comparing (e.g., upon an execution by the electronic processing device), utilizing at least one of the first, second, and third numbers, and by accessing the database storing data descriptive of the plurality of previous/historic query/claims data, of the current insurance claim to previous insurance claims in which a cause of loss was identified. In some embodiments, the cause of loss AI model may identify (e.g., based on the comparison) one or more similar previous claims and the causes of loss identified for such claim(s). According to some embodiments, the cause of loss AI model may conduct a computing, based on the comparing of the current insurance claim to previous insurance claims in which a cause of loss was identified, of a cause of loss for the current insurance claim. In some embodiments, the cause of loss may be utilized in the computing of the claim result (e.g., at 526) and/or may be utilized to provide cause-specific data and/or guidance to the user (e.g., tips for preventing such type of loss in the future).

According to some embodiments, the AI system may comprise an AI fraud detection model (e.g., a seventh AI module) that conducts a comparing (e.g., upon an execution by the electronic processing device), utilizing at least one of the first, second, and third numbers, and by accessing the database storing data descriptive of the plurality of previous/historic query/claims data, of the current query/claim to previous queries/claims in which fraud had occurred. In some embodiments, the AI fraud detection model may identify (e.g., based on the comparison) one or more similar previous queries/claims in which fraud was previously determined to have occurred. According to some embodiments, the AI fraud detection model may conduct a computing, based on the comparing of the current query/claim to the previous query/claim(s) in which fraud had occurred, of a statistical likelihood that the current query/claim is fraudulent. A degree of similarity (e.g., based on one or more of the computed numeric expressions) between one or more aspects of the current query/claim and the previous fraudulent query/claim may be utilized, in some embodiments, to derive and/or calculate the statistical likelihood, e.g., utilizing a mathematical model defined by the AI fraud detection model.

In some embodiments, the method 500 may comprise transmitting the claim result (e.g., via the wireless electronic network and/or to the mobile electronic device), at 528. The AI system may, for example, send a signal indicative of the result to the mobile electronic device that causes the mobile device application to output an indication of the result to the user. A GUI output by the mobile electronic device may, in some embodiments, provide a visual indication of the resolution for the current query and/or insurance claim. In such a manner, for example, the user may quickly and easily initiate a query/claim utilizing the smart card (e.g., increasing the likelihood of accurate information being submitted), conduct an online chat with an AI-based virtual assistant, upload supporting data (e.g., the sensor data), and receive a visual indication of the result of the submission, all in a timely and less error prone manner than in previous systems. According to some embodiments, the utilization of the multiple (e.g., three (3)) AI modules to process the various inputs and combine them into a single number and/or set of numbers may greatly enhance the accuracy and speed of the results as compared to previous systems.

Figure 6:
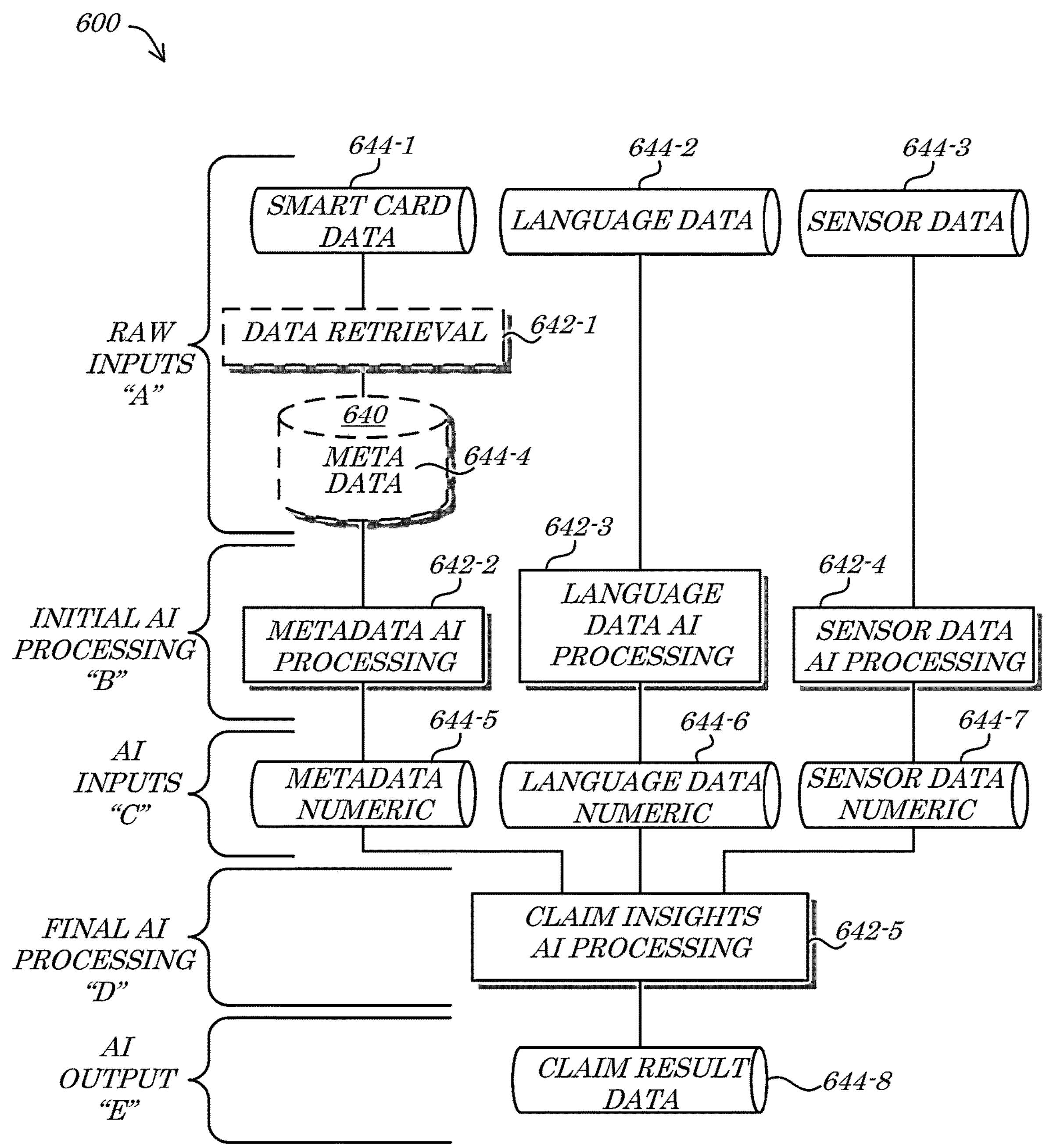
FIG. 6 is a systemic flow diagram of a method according to some embodiments.

Referring now to FIG. 6, a systemic flow diagram of a method 600 according to some embodiments is shown. In some embodiments, the method 600 may be performed and/or implemented by and/or otherwise associated with one or more specialized and/or specially-programmed computers (e.g., one or more of the user devices 102*a-n*, mobile electronic device 202, handheld device 402, the controller device 110, the servers 210, 410, the smart cards 106, 206 306, 406, and/or the apparatus 810 of FIG. 1, FIG. 2, FIG. 3, FIG. 4, and/or FIG. 8 herein), computer terminals, computer servers, computer systems and/or networks, and/or any combinations thereof (e.g., by one or more multi-threaded and/or multi-core processing units of a multivariate AI smart card data processing system). In some embodiments, the method 600 may be embodied in, facilitated by, and/or otherwise associated with various input mechanisms and/or interfaces (such as the interfaces 220, 720*a-d*, 820 of FIG. 2, FIG. 7A, FIG. 7B, FIG. 7C, FIG. 7D, and/or FIG. 8 herein).

In some embodiments, the method 600 may comprise acquiring raw inputs, at "A". Any or all of smart card data 644-1, language (e.g., natural language) data 644-2, and/or sensor data 644-3 may, for example, be provided as inputs into the method 600. According to some embodiments, the method 600 may comprise utilization of a data retrieval tool or module 642-1 to identify and/or retrieve metadata 644-4 from a database 640. The data retrieval tool 642-1 may, for example, utilize the smart card data 644-1 as a query input to identify and/or retrieve the metadata 644-4, e.g., stored in relation thereto. In some embodiments, the smart card data 644-1 and/or the metadata 644-4 may comprise indications of an account number, an address, a geo-location value (e.g., coordinates), a date, time, etc. According to some embodiments, the language data 644-2 may comprise text, audio, video, and/or other representations of natural human expression and/or language, such as a textual description of a query/claim of loss. In some embodiments, the sensor data 644-3 may comprise various sensor readings and/or data, such as an image of the damage/loss and/or of a particular object.

According to some embodiments, the method 600 may comprise conducting initial AI processing, at "B". The initial AI processing may comprise, for example, utilization of a metadata AI processing tool or module 642-2, a language data AI processing tool or module 642-3, and/or a sensor data AI processing tool or module 642-4. The AI modules 642-2, 642-3, 642-4 may, in some embodiments, apply one or more mathematical and/or logical models to convert the smart card data 644-1, the language data 644-2, the sensor data 644-3, and/or the metadata 644-4 into one or more numeric expressions that are utilized as AI inputs, at "C". The smart card data 644-1 and/or the metadata 644-4 may, for example, be converted (e.g., by the metadata AI processing module 642-2) into a series of numbers, such as "[0.018426, 0.000433, . . . , −0.003075, −0.024303]" defining a metadata numeric 644-5. In some embodiments, the metadata numeric 644-5 may comprise five hundred and twelve (512) numbers arranged in a series, matrix, etc. According to some embodiments, the language data 644-2 may be converted (e.g., by the language data AI processing module 642-3) into a series of numbers, such as "[0.08311458, 0.01241801, . . . , −0.13994503, 0.00641239]" defining a language data numeric 644-6. In some embodiments, the language data numeric 644-6 may comprise one thousand and twenty-four (1024) numbers arranged in a series, matrix, etc. In some embodiments, the sensor data 644-3 may be converted (e.g., by the sensor data AI processing module 642-4) into a series of numbers, such as "[0.32706347, 1.1575251, . . . , 1.5985818, 2.205582]" defining a sensor data numeric 644-7. In some embodiments, the sensor data numeric 644-7 may comprise two thousand and forty-eight (2048) numbers arranged in a series, matrix, etc.

In some embodiments, the method 600 may comprise conducting final AI processing, at "D". The method 600 may, for example, utilize a claim insights AI processing tool or module 642-5 that accepts each of the numeric expressions 644-5, 644-6, 644-7 as inputs and conducts one or more comparisons with stored numeric expressions representative of previous/historic queries/claims. The claim insights AI processing module 642-5 may, in some embodiments, mathematically combine and/or operate upon the numeric expressions 644-5, 644-6, 644-7 for use in the comparison. According to some embodiments, the numeric expressions 644-5, 644-6, 644-7 may be combined by the claim insights AI processing module 642-5 into a single data string, stream, and/or expression, such as "[0.08311458, 0.01241801, . . . , −0.13994503, 0.00641239, 0.32706347, 1.1575251, . . . , 1.5985818, 2.205582, 0.018426, 0.000433, . . . , −0.003075, −0.024303]" which, in the ongoing non-limiting example, may comprise three thousand five hundred and eighty-four (3584) numbers. In some embodiments, the result of the comparison(s) may be utilized to derive, calculate, generate, and/or otherwise compute query and/or claim result data 644-8 as AI output, at "E". As described herein, for example, the claim result data 644-8 may comprise a determination regarding whether a claim of loss should be paid (or not), and what amount should be paid (e.g., based on a damage estimate).

IV. Multivariate AI Smart Card Interfaces

Turning now to FIG. 7A, FIG. 7B, FIG. 7C, and FIG. 7D, diagrams of a system 700 depicting a user device 702 providing instances of an example interface 720*a-d* according to some embodiments are shown. In some embodiments, the interface 720*a-d* may comprise a web page, web form, database entry form, API, spreadsheet, table, and/or application or other GUI via which a user or other entity may enter data (e.g., provide or define input) to enable multivariate AI smart card processing and/or outputting of automated query/claim results, as described herein. The interface 720*a-d* may, for example, comprise a front-end of a multivariate AI smart card system client-side and/or mobile device application, program, and/or platform programmed and/or otherwise configured to execute, conduct, and/or facilitate the methods 400, 500, 600 of FIG. 4, FIG. 5, and/or FIG. 6 herein, and/or portions or combinations thereof. In some embodiments, the interface 720*a-d* may be output via a computerized device, such as the user device 702, which may for example, be similar in configuration to one or more of the user devices 102*a-n*, mobile electronic device 202, handheld device 402, the controller device 110, the servers 210, 410, the apparatus 810, and/or the smart cards 106, 206 306, 406, of FIG. 1, FIG. 2, FIG. 3, FIG. 4, and/or FIG. 8 herein.

Figure 7A:
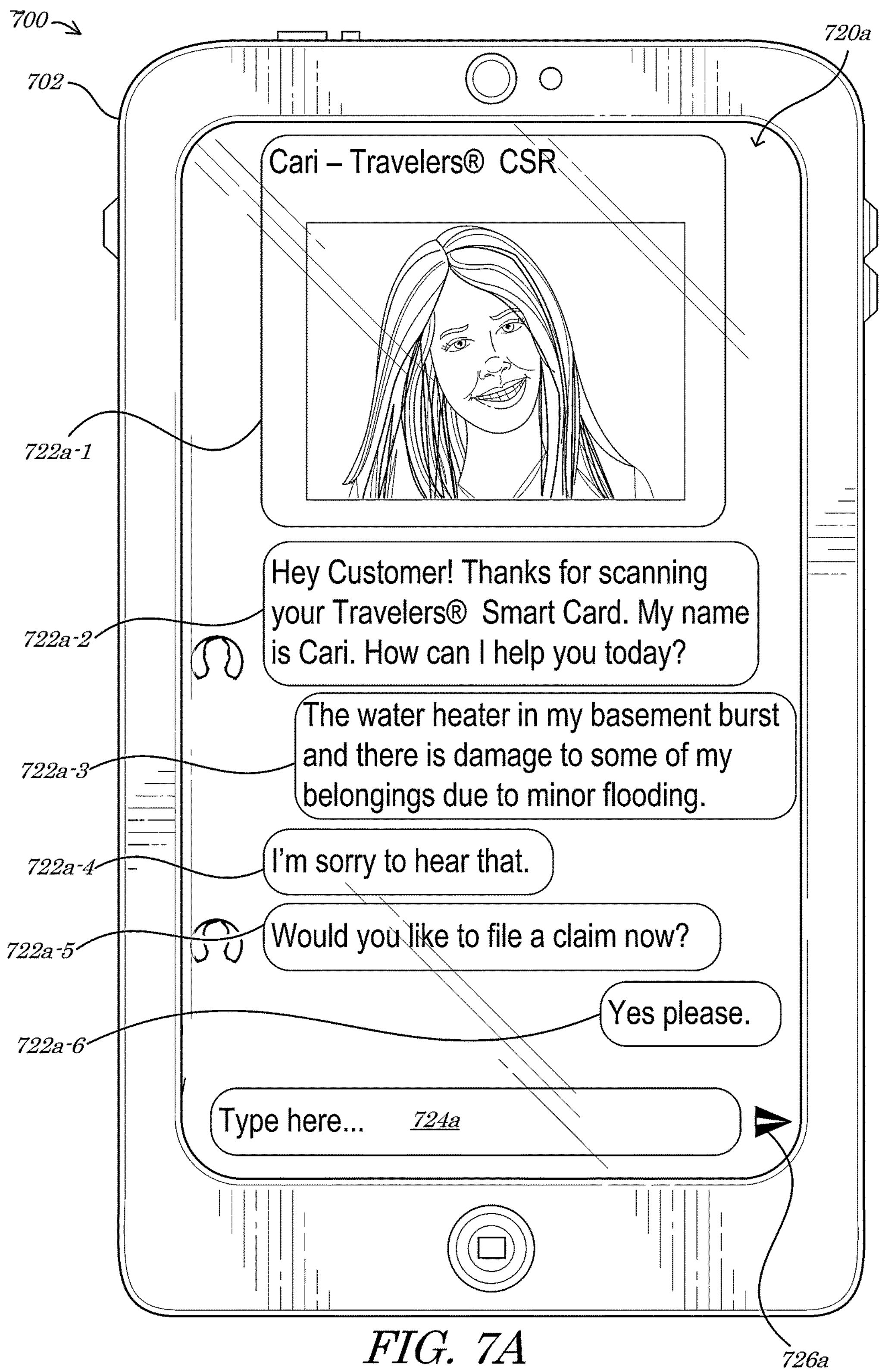
FIG. 7A, FIG. 7B, FIG. 7C, and FIG. 7D are diagrams of a system providing example interfaces according to some embodiments.

According to some embodiments, the interface 720*a-d* may comprise one or more tabs and/or other segmented and/or logically-presented data forms and/or fields. In some embodiments, the interface 720*a-d* may be configured and/ or organized to allow and/or facilitate entry and/or capture of information defining a user query, query metadata, smart card data, natural language data, image data, and/or other sensor data. According to some embodiments, the interface 720*a-d* may comprise an automated AI chat page via which the user may intuitively be guided to provide the information required for AI processing of the user's query (e.g., claim submission). As depicted in FIG. 7A, for example, a first version (or page or instance) of the first version interface 720*a* may comprise a first chat message 722*a*-1, such as the initial, welcome, and/or introductory message from an automated AI virtual assistant "Cari". According to some embodiments, the first version of the interface 720*a* may comprise a second chat message 722*a*-2 that provides a first query to the user, e.g., asking the user to provide information descriptive of the user's query/issue. According to some embodiments, each of the first and second chat messages 722*a*-1, 722*a*-2 may be automatically generated by a multivariate AI smart card system (not shown) in response to receiving smart card data from the user device 702, as described herein.

In some embodiments, the first version of the interface 720*a* may comprise a third chat message 722*a*-3, such as a first response from the user and/or a description of the user's query/claim of loss. As depicted in FIG. 7A, the user may provide input noting that the user's water heater has failed and caused minor flooding damage in the user's home. According to some embodiments, the first version of the interface 720*a* may comprise a fourth chat message 722*a*-4, such as a first natural language AI response. The natural language AI response may, for example, comprise an AI output constructed of natural language elements (e.g., specifically chosen words) based on the user's description of the query/loss as displayed in the third chat message 722*a*-3. As described herein, for example, the AI system may evaluate the content of the third chat message 722*a*-3 to trigger an identification of an intent/issue presented by the user, to identify and/or select an appropriate contextual response, and to formulate the first natural language AI response as output via the fourth chat message 722*a*-4. In some embodiments, the first version of the interface 720*a* may comprise a fifth chat message 722*a*-5, such as a second natural language AI response. The second natural language AI response may comprise, for example, a contextual query (e.g., a second query to the user) asking whether the user would like to file/submit a claim for the loss. In some embodiments, the first version of the interface 720*a* may comprise a sixth chat message 722*a*-6, such as a second response from the user indicating that the user would like to initiate a claims (and/or other automated AI decision-making result) process.

According to some embodiments, the first version of the interface 720*a* may comprise a first text/chat entry area 724*a* that comprises an input mechanism (e.g., defining a first input mechanism) via which the user may enter queries and/or responses that are transmitted to the AI smart card system. In some embodiments, the first version of the interface 720*a* may comprise a first text/chat transmission button 726*a* that triggers the transmission upon receiving an indication (e.g., a click or touch) of activation or selection from the user.

Figure 7B:
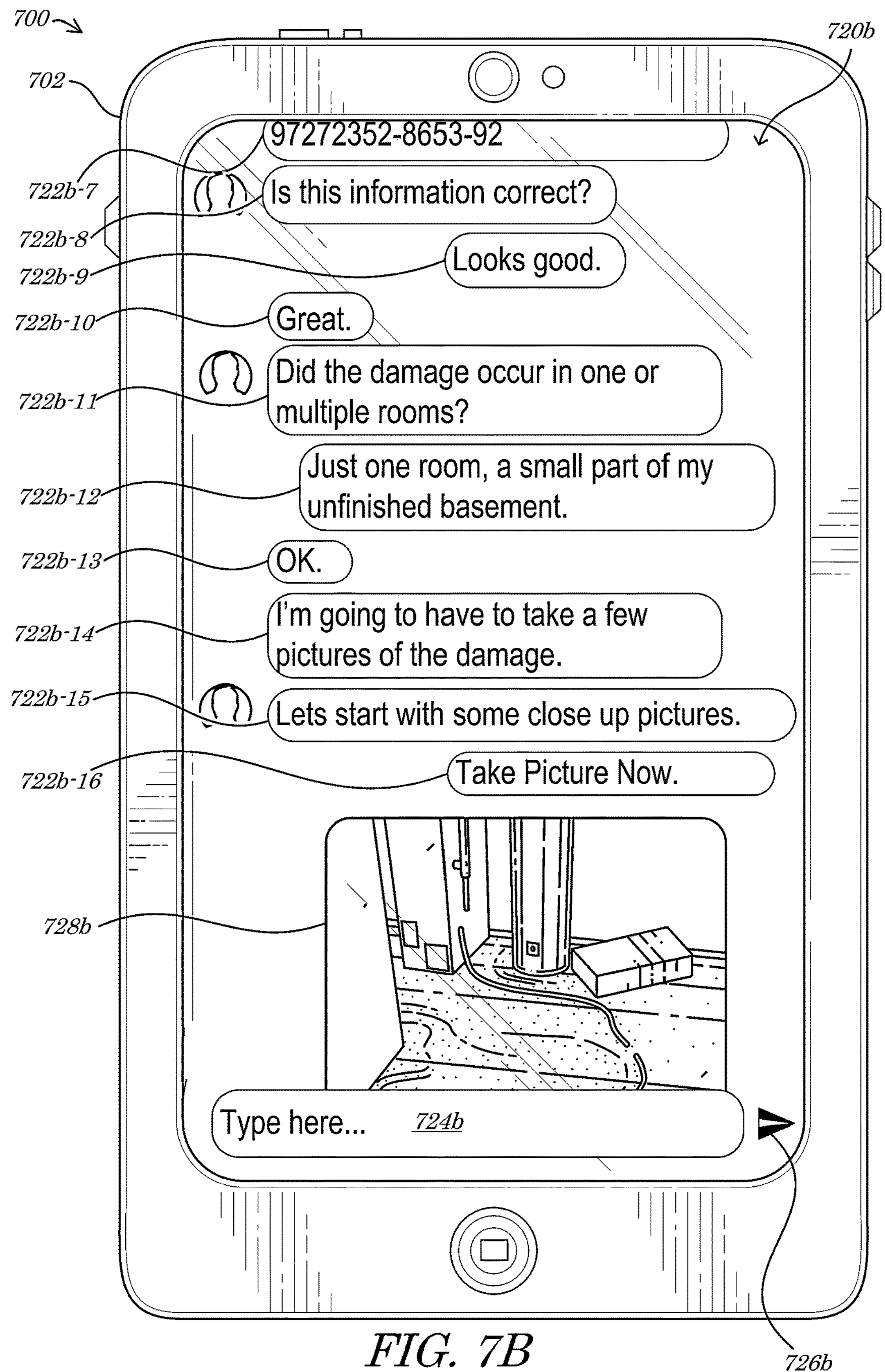

Referring to FIG. 7B, a second version (or page or instance) of the interface 720*b* may comprise a continuation of the automated AI chat session initiated in FIG. 7A. The second version of the interface 720*b* may comprise, for example, a seventh chat message 722*b*-7 (only a portion of which is depicted in FIG. 7B) that is descriptive of information obtained from a smart card and/or as a result of a metadata query conducted by the AI system. In some embodiments, the automated AI virtual assistant may trigger an outputting of the metadata to the user via the seventh chat message 722*b*-7 and may output an eighth chat message 722*b*-8 comprising a query (e.g., a third query to the user) asking whether the metadata is correct. According to some embodiments, each of the seventh and eighth chat messages 722*b*-7, 722*b*-8 may be automatically generated by the multivariate AI smart card system in response to receiving the smart card data from the user device 702, as described herein.

In some embodiments, the second version of the interface 720*b* may comprise a ninth chat message 722*b*-9, such as a third response from the user, e.g., confirming the accuracy of the metadata (as depicted in FIG. 7B) or providing edits/corrections, as the case may be. According to some embodiments, the second version of the interface 720*b* may comprise a tenth chat message 722*b*-10, such as a third natural language AI response. The natural language AI response may, for example, comprise an AI output constructed of natural language elements (e.g., specifically chosen words) based on the user's answer to the third user query as provided by the user in the ninth chat message 722*b*-9. The AI system may evaluate the content of the ninth chat message 722*b*-9, for example, to trigger an identification of an intent/issue presented by the user, to identify and/or select an appropriate contextual response, and to formulate the third natural language AI response as output via the tenth chat message 722*b*-10 (e.g., confirming receipt and/or acknowledgement of the user's answer). In some embodiments, the second version of the interface 720*b* may comprise an eleventh chat message 722*b*-11, such as a fourth natural language AI response. The fourth natural language AI response may comprise, for example, a contextual query (e.g., a fourth query to the user) asking for more specific details descriptive of the event/loss. In some embodiments, the second version of the interface 720*b* may comprise a twelfth chat message 722*b*-12, such as a fourth response from the user that provides additional textual (and/or other multimedia, such as voice) details descriptive of the event/loss.

According to some embodiments, the second version of the interface 720*b* may comprise a thirteenth chat message 722*b*-13, such as a fifth natural language AI response. The natural language AI response may, for example, comprise an AI output constructed of natural language elements (e.g., specifically chosen words) based on the user's answer to the fourth user query as provided by the user in the twelfth chat message 722*b*-12. The AI system may evaluate the content of the twelfth chat message 722*b*-12, for example, to trigger an identification of an intent/issue presented by the user, to identify and/or select an appropriate contextual response, and to formulate the fifth natural language AI response as output via the thirteenth chat message 722*b*-13 (e.g., confirming receipt and/or acknowledgement of the user's answer). In some embodiments, the second version of the interface 720*b* may comprise a fourteenth chat message 722*b*-14 and/or a fifteenth chat message 722*b*-15, either or both of which may comprise a sixth natural language AI response. The sixth natural language AI response may comprise, for example, contextual data and/or a query (e.g., a fifth query to the user) directed to acquiring images (and/or other sensor data) descriptive of the event/loss. In some embodiments, the sixth natural language AI response(s) may provide specific directions for acquiring the requested data such as the type of picture requested (e.g., a "close up"

picture), quantity of images, list of images, type of data/sensor reading requested, and/or instructions for how to acquire/capture the requested data (e.g., instructions regarding activation of a particular sensor device (not shown) via the user device 702). According to some embodiments, the second version of the interface 720*b* may comprise a sixteenth chat message 722*b*-16, such as a fifth response from the user that provides authorization for the acquisition of the requested images/data. The fifth response may, for example, comprise an authorization from the user that permits the AI system to take control of the camera/sensor of (or coupled to) the user device 702.

In some embodiments, the user and/or the AI system may capture a first image 728*b* that is output via the second version of the interface 720*b* (and/or transmitted to the AI system for analysis). The first image 728*b* may, for example, comprise an image of a leaking/damaged water heater in the user's basement, as originally textually described by the user in the user's description of the query/loss as displayed in the third chat message 722*a*-3 of the first version of the interface 720*a* in FIG. 7A. According to some embodiments, the second version of the interface 720*b* may comprise a second text/chat entry area 724*b* that comprises an input mechanism (e.g., defining a second input mechanism) via which the user may enter queries and/or responses that are transmitted to the AI smart card system. In some embodiments, the second version of the interface 720*b* may comprise a second text/chat transmission button 726*b* that triggers the transmission upon receiving an indication (e.g., a click or touch) of activation or selection from the user.

Figure 7C:
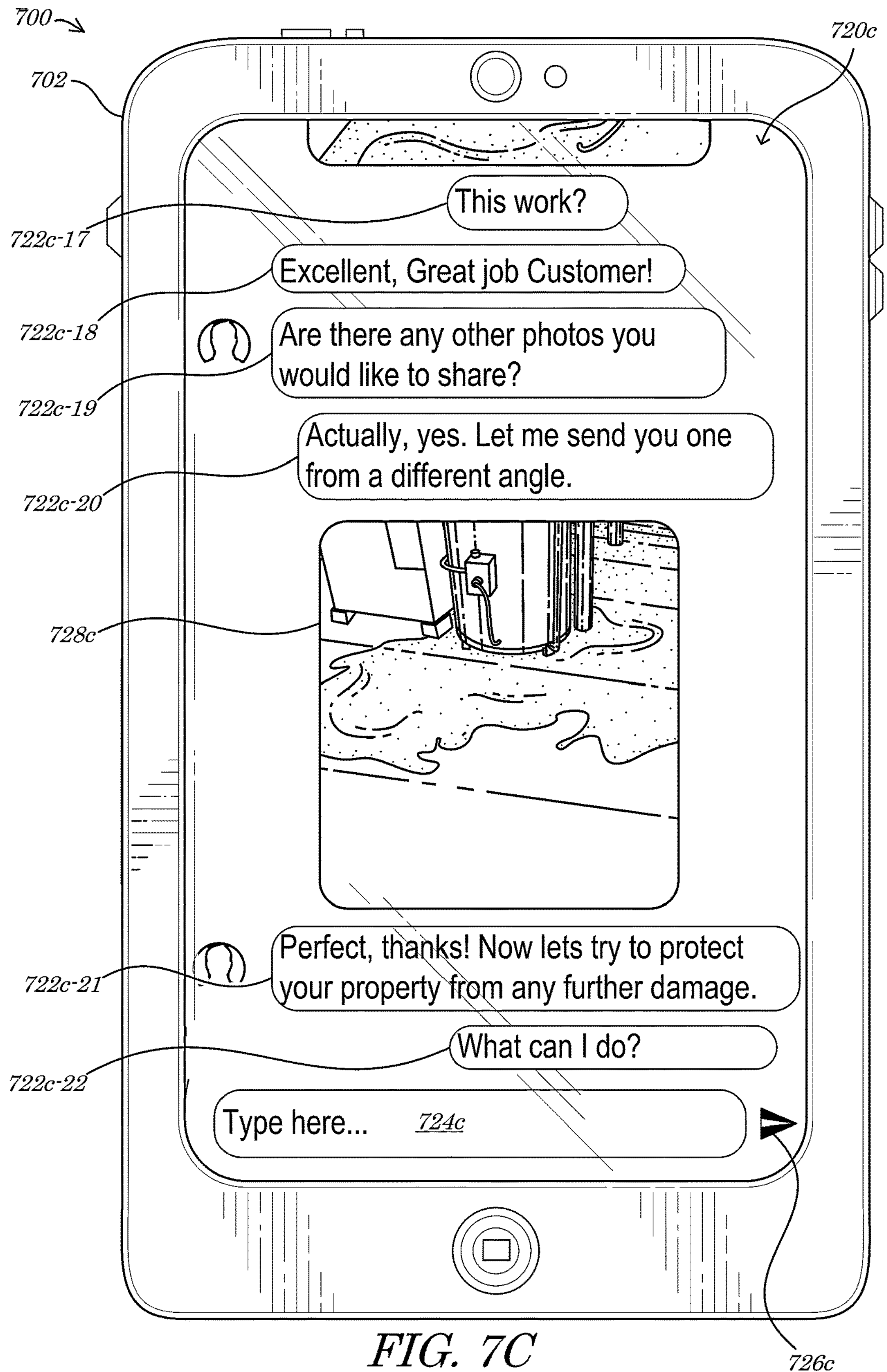

Referring to FIG. 7C, a third version (or page or instance) of the interface 720*c* may comprise a continuation of the automated AI chat session of FIG. 7A and/or FIG. 7B. The third version of the interface 720*c* may comprise, for example, a seventeenth chat message 722*c*-17, such as a sixth response from the user, e.g., asking the AI system whether the submitted image/data (e.g., the first image 728*b*) is acceptable. According to some embodiments, the third version of the interface 720*c* may comprise an eighteenth chat message 722*c*-18, such as a seventh natural language AI response. The natural language AI response may, for example, comprise an AI output constructed of natural language elements (e.g., specifically chosen words) based on the sixth response from the user provided by the user in the seventeenth chat message 722*c*-17 and/or based on the captured image/data (e.g., the first image 728*b*). The AI system may evaluate the content of the seventeenth chat message 722*c*-17 and/or the first image 728*b*, for example, to trigger an evaluation and/or analysis of the first image 728*b*, to identify an adequacy of information derived from the first image 728*b*, to identify and/or select an appropriate contextual response, and to formulate the seventh natural language AI response as output via the eighteenth chat message 722*c*-18 (e.g., acknowledging that the first image 728*b* is acceptable, as depicted, or requesting additional images/sensor data, as the case may be). In some embodiments, the third version of the interface 720*c* may comprise a nineteenth chat message 722*c*-19, such as an eighth natural language AI response. The eighth natural language AI response may comprise, for example, a contextual query (e.g., a sixth query to the user) asking if the user would like to share any additional images/data descriptive of the event/loss. In some embodiments, the third version of the interface 720*c* may comprise a twentieth chat message 722*c*-20, such as a seventh response from the user that provides additional textual (and/or other multimedia, such as voice) details descriptive of the event/loss and/or provides a second image 728*c*.

According to some embodiments, the third version of the interface 720*c* may comprise a twenty-first chat message 722*c*-21, such as a ninth natural language AI response. The natural language AI response may, for example, comprise an AI output constructed of natural language elements (e.g., specifically chosen words) based on the second image 728*c*. The AI system may evaluate the second image 728*c*, for example, to trigger an analysis of the second image 728*c*, to identify an adequacy of information derived from the second image 728*c*, to identify and/or select an appropriate contextual response, and to formulate the ninth natural language AI response as output via the twenty-first chat message 722*c*-21 (e.g., confirming an adequacy of the second image 728*c* and/or asking the user whether the user would like to protect their property from further damage). In some embodiments, the third version of the interface 720*c* may comprise twenty-second chat message 722*c*-22, which may comprise an eighth response from the user. The eighth response may comprise, for example, a request for additional information and/or an affirmation that the user would like to learn how to avoid additional damage). According to some embodiments, the AI system may then guide the user (not shown) utilizing how-to videos, continued chat session details, checklists, etc.

In some embodiments, the third version of the interface 720*c* may comprise a third text/chat entry area 724*c* that comprises an input mechanism (e.g., defining a third input mechanism) via which the user may enter queries and/or responses that are transmitted to the AI smart card system. In some embodiments, the third version of the interface 720*c* may comprise a third text/chat transmission button 726*c* that triggers the transmission upon receiving an indication (e.g., a click or touch) of activation or selection from the user.

Figure 7D:
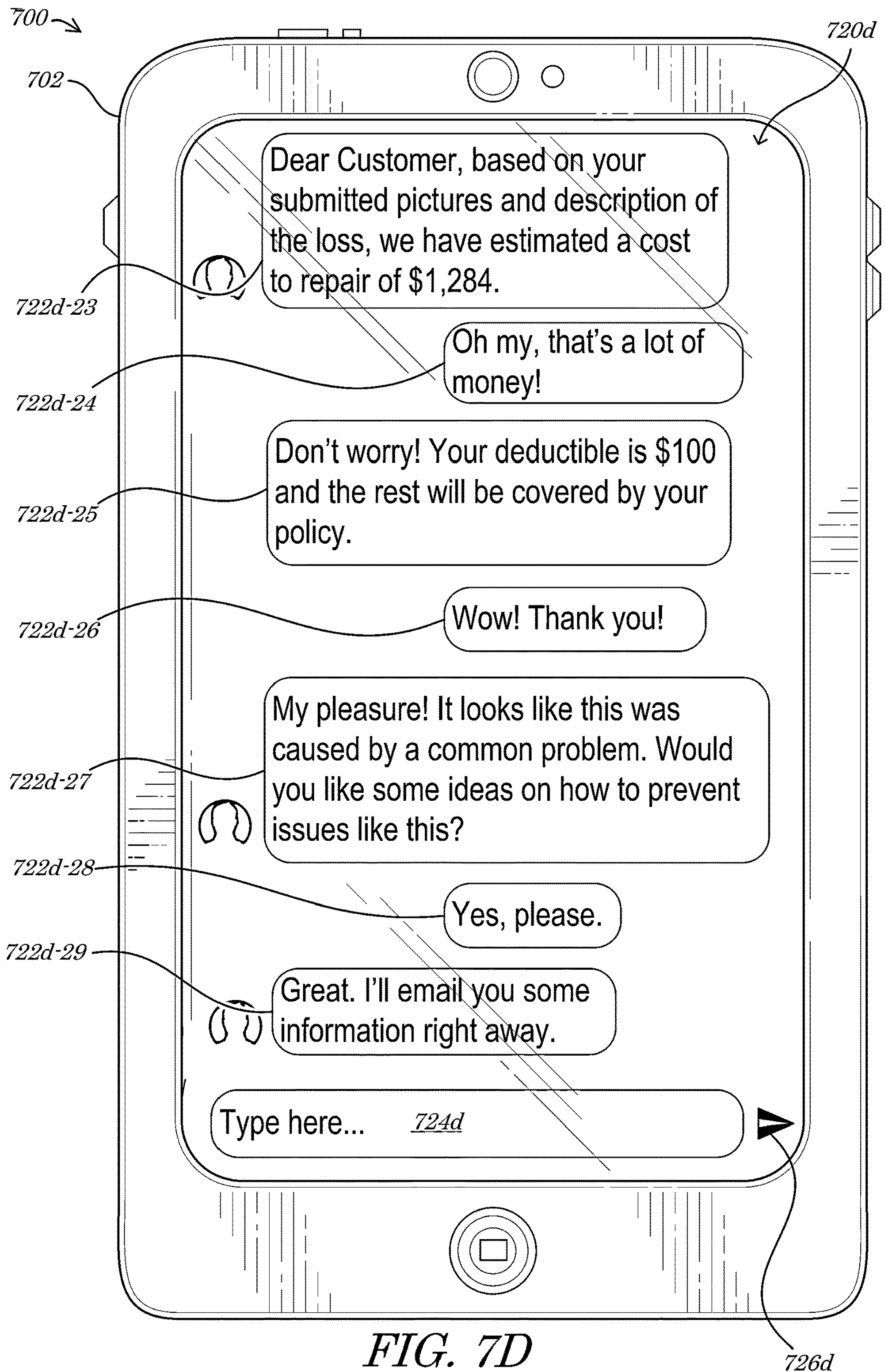

Referring to FIG. 7D, a fourth version (or page or instance) of the interface 720*d* may comprise a continuation of the automated AI chat session of FIG. 7A, FIG. 7B, and/or FIG. 7C, and/or may comprise a separate chat session. The fourth version of the interface 720*d* may comprise, for example, an automated damage estimation and/or query/claim result platform that offers resolution to the user's query/claim. According to some embodiments, the fourth version of the interface 720*d* may comprise a twenty-third chat message 722*d*-23, such as a tenth natural language AI response. The natural language AI response may, for example, comprise an AI output constructed of natural language elements (e.g., specifically chosen words) based on an AI analysis of captured images/data and/or a comparison of the captured/acquired data to prestored reference images/data. In some embodiments, the damage estimate may be based on pre-recorded damage figures for previous events/losses that are identified as being similar to the current event/loss (e.g., based on multivariate AI smart card analysis as described herein). According to some embodiments, the fourth version of the interface 720*d* may comprise a twenty-fourth chat message 722*d*-24, such as a ninth response from the user (e.g., expressing surprise and/or concern regarding the damage estimate value). In some embodiments, the fourth version of the interface 720*d* may comprise a twenty-fifth chat message 722*d*-25, such as an eleventh natural language AI response. The AI system may evaluate the content of the twenty-fourth chat message 722*d*-24, for example, to trigger an evaluation and/or analysis of the ninth response, to identify and/or select an appropriate contextual response, and to formulate the eleventh natural language AI response as output via the twenty-fifth chat message **722*d*-25** (e.g., acknowledging the user's concern by providing detailed and/or applicable information regarding the user's deductible).

In some embodiments, the fourth version of the interface **720*d* may comprise a twenty-sixth chat message 722*d*-26, such as a tenth response from the user (e.g., expressing thanks and/or relief). According to some embodiments, the fourth version of the interface 720*d* may comprise a twenty-seventh chat message 722*d*-27, such as a twelfth natural language AI response. The AI system may evaluate the content of the twenty-sixth chat message 722*d*-26, for example, to trigger an evaluation and/or analysis of the tenth response, to identify and/or select an appropriate contextual response, and to formulate the twelfth natural language AI response as output via the twenty-seventh chat message 722*d*-27 (e.g., acknowledging the user's response). According to some embodiments, the twelfth natural language AI response may also or alternatively comprise a contextual query (e.g., a seventh query to the user) asking if the user would like to details regarding the cause of loss and/or regarding how to prevent additional losses. In some embodiments, the fourth version of the interface 720*d* may comprise a twenty-eighth chat message 722*d*-28, such as an eleventh response from the user that indicates an interest in obtaining additional data and/or guidance. In some embodiments, the fourth version of the interface 720*d* may comprise a twenty-ninth chat message 722*d*-29**, such as a thirteenth natural language AI response that acknowledge the user's desire and notifies the user regarding the additional information/guidance.

In some embodiments, the fourth version of the interface **720*d* may comprise a fourth text/chat entry area 724*d* that comprises an input mechanism (e.g., defining a fourth input mechanism) via which the user may enter queries and/or responses that are transmitted to the AI smart card system. In some embodiments, the fourth version of the interface 720*d* may comprise a fourth text/chat transmission button 726*d*** that triggers the transmission upon receiving an indication (e.g., a click or touch) of activation or selection from the user.

While various components of the interface **720*a-d*** have been depicted with respect to certain labels, layouts, headings, titles, contexts, relationships, and/or configurations, these features have been presented for reference and example only. Other labels, layouts, headings, titles, contexts, relationships, and/or configurations may be implemented without deviating from the scope of embodiments herein. Similarly, while a certain number of tabs, information screens, form fields, chat messages, and/or data entry options have been presented, variations thereof may be practiced in accordance with some embodiments.

V. Multivariate AI Smart Card Apparatus & Articles of Manufacture

Figure 8:
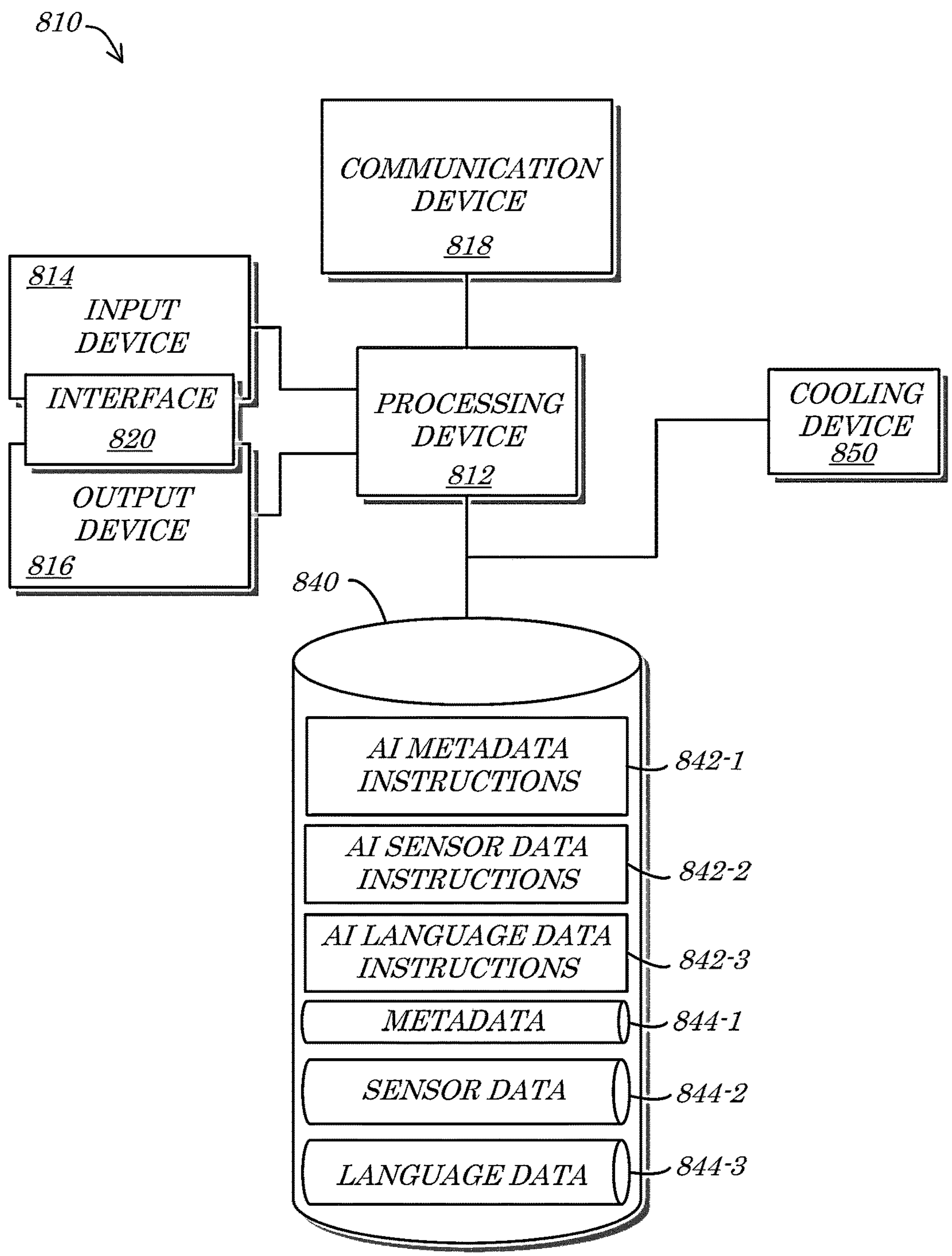
FIG. 8 is a block diagram of an apparatus according to some embodiments.
Figure 9A:
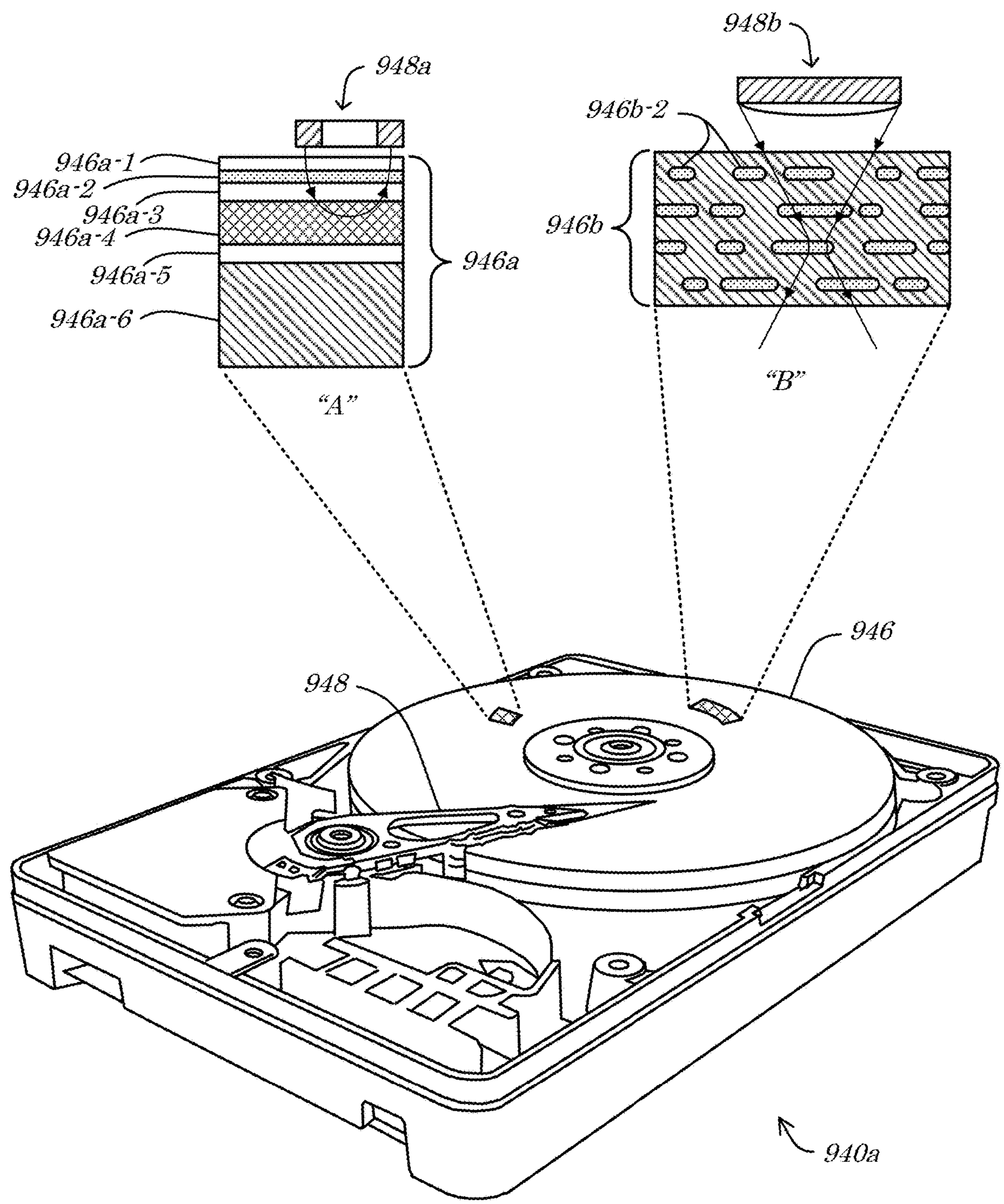
FIG. 9A, FIG. 9B, FIG. 9C, FIG. 9D, and FIG. 9E are perspective diagrams of exemplary data storage devices according to some embodiments.
Figure 9B:
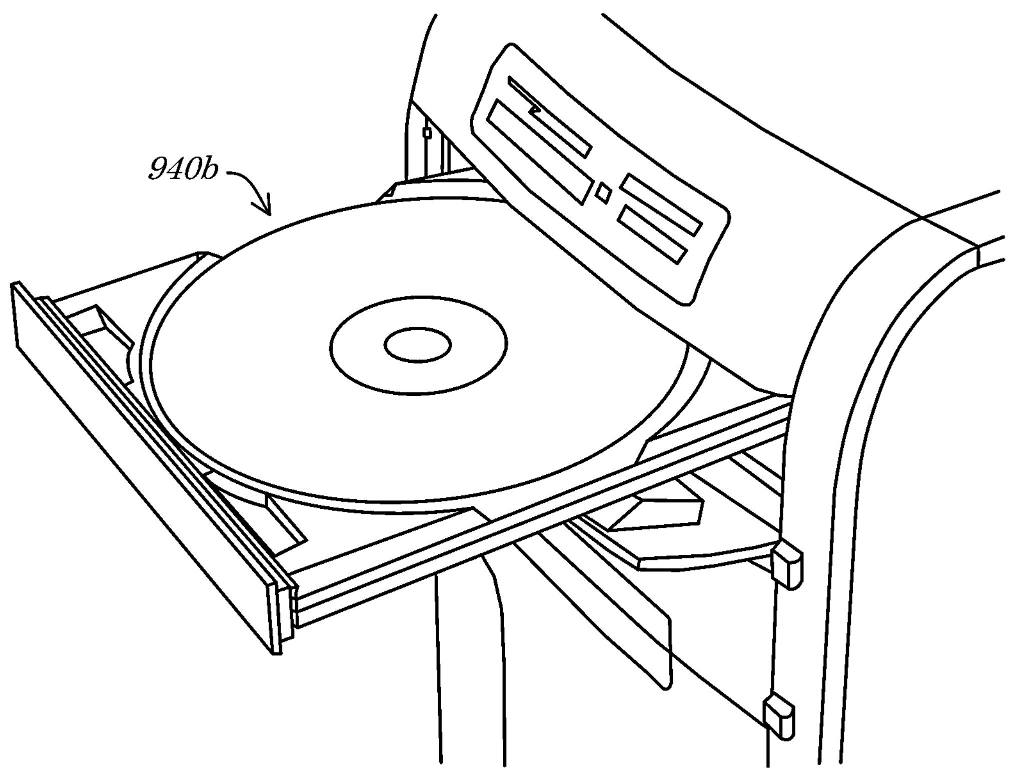
Figure 9C:
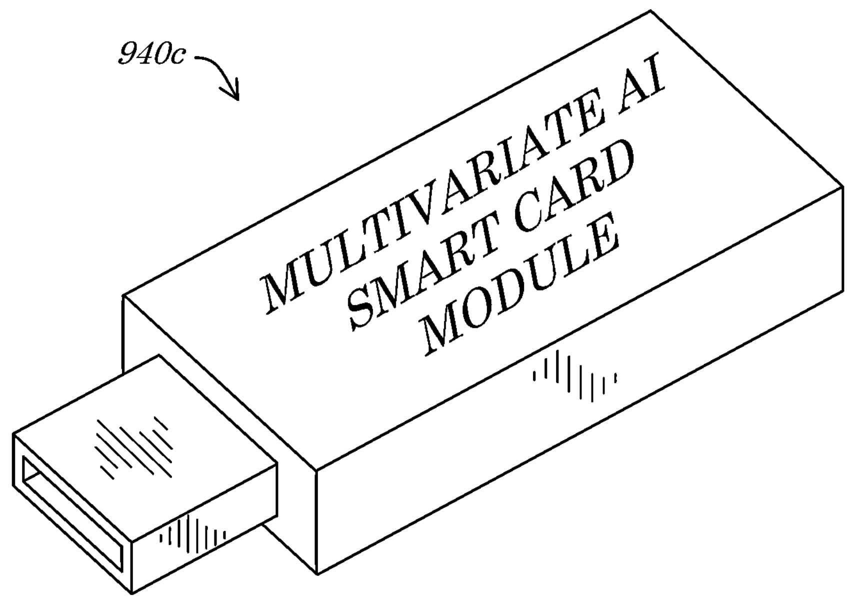
Figure 9D:
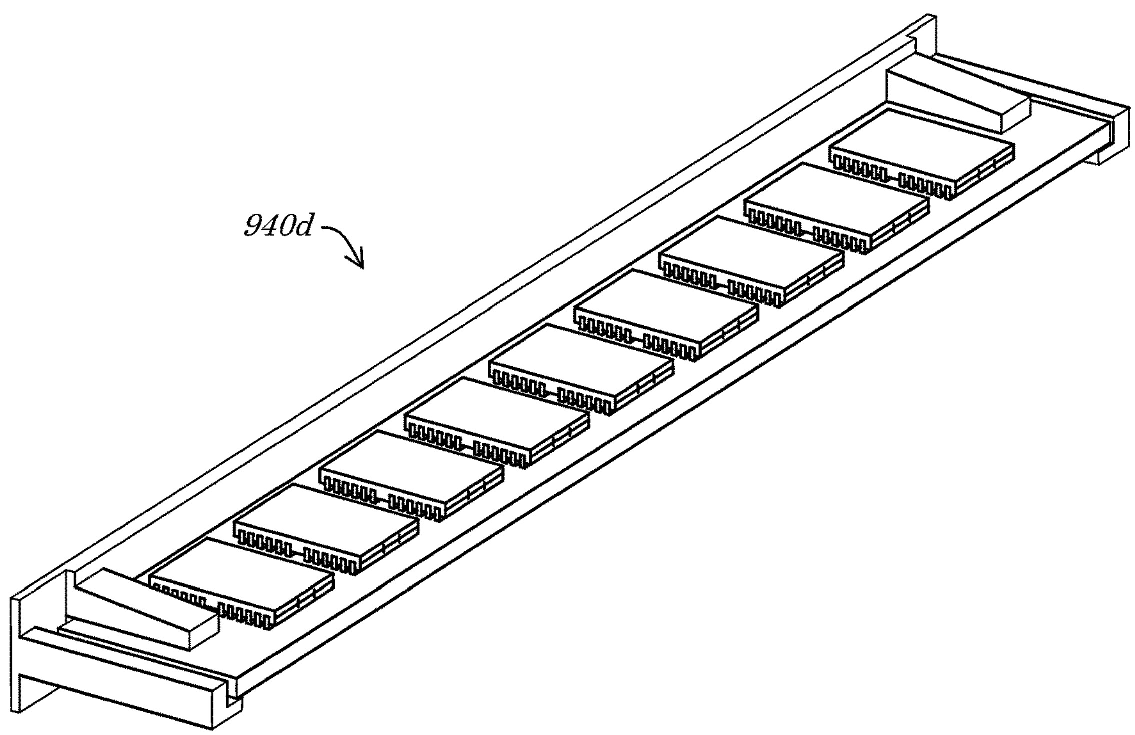
Figure 9E:
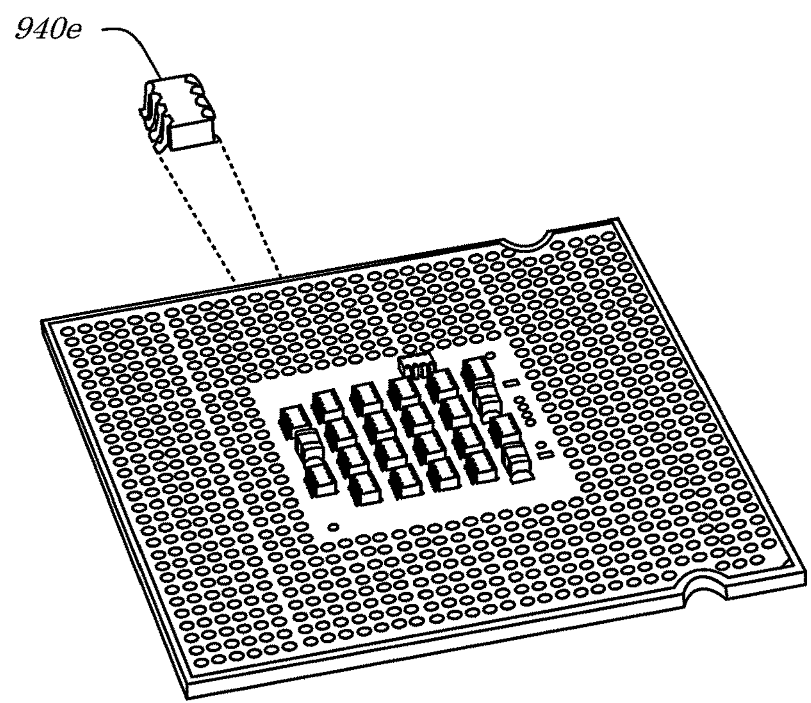

Turning to FIG. 8, a block diagram of an apparatus 810 according to some embodiments is shown. In some embodiments, the apparatus 810 may be similar in configuration and/or functionality to one or more of the user devices **102*a-n*, mobile electronic device 202, handheld device 402, the controller device 110, the servers 210, 410, and/or the smart cards 106, 206 306, 406, of FIG. 1, FIG. 2, FIG. 3, and/or FIG. 4 herein. The apparatus 810 may, for example, execute, process, facilitate, and/or otherwise be associated with the methods 400, 500, 600 of FIG. 4, FIG. 5, and/or FIG. 6 herein, and/or portions or combinations thereof. In some embodiments, the apparatus 810 may comprise a processing device 812, an input device 814, an output device 816, a communication device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810** without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E7501 chipset. In some embodiments, the processor 812 may comprise multiple inter-connected processors, microprocessors, and/or micro-engines. According to some embodiments, the processor 812 (and/or the apparatus 810 and/or other components thereof) may be supplied power via a power supply (not shown) such as a battery, an AI ternating Current (AC) source, a Direct Current (DC) source, an AC/DC adapter, solar cells, and/or an inertial generator. In the case that the apparatus 810 comprises a server such as a blade server or a virtual co-location device, necessary power may be supplied via a standard AC outlet, power strip, surge protector, and/or Uninterruptible Power Supply (UPS) device.

In some embodiments, the input device 814 and/or the output device 816 are communicatively coupled to the processor 812 (e.g., via wired and/or wireless connections and/or pathways) and they may generally comprise any types or configurations of input and output components and/or devices that are or become known, respectively. The input device 814 may comprise, for example, a keyboard that allows an operator of the apparatus 810 to interface with the apparatus 810 (e.g., by an administrator, such as to setup and/or configure a multivariate AI smart card processing system, as described herein). In some embodiments, the input device 814 may comprise a sensor, such as a camera, sound, light, and/or proximity sensor configured to measure parameter values and report measured values via signals to the apparatus 810 and/or the processor 812. The output device 816 may, according to some embodiments, comprise a display screen and/or other practicable output component and/or device. The output device 816 may, for example, provide an interface (such as the interface 220 and/or the interface **720*a-d* of FIG. 2, FIG. 7A, FIG. 7B, FIG. 7C, and/or FIG. 7D herein) via which multivariate AI smart card processing and/or query result determination functionality is provided to a user (e.g., via a website and/or mobile application). According to some embodiments, the input device 814 and/or the output device 816** may comprise and/or be embodied in a single device such as a touch-screen monitor.

In some embodiments, the communication device 818 may comprise any type or configuration of communication device that is or becomes known or practicable. The communication device 818 may, for example, comprise a Network Interface Card (NIC), a telephonic device, a cellular network device, a router, a hub, a modem, and/or a communications port or cable. In some embodiments, the communication device 818 may be coupled to receive smart card and/or local environment sensor data and/or forward such data to one or more other (e.g., remote) devices (not shown in FIG. 8). The communication device 818 may, for example, comprise a BLE and/or RF receiver device and/or a camera or other imaging device that acquires data from a smart card (not separately depicted in FIG. 8) and/or a transmitter device that provides the data to a remote server (also not separately shown in FIG. 8). According to some embodiments, the communication device 818 may also or alternatively be coupled to the processor 812. In some embodiments, the communication device 818 may comprise an IR, RF, Bluetooth™, Near-Field Communication (NFC), and/or Wi-Fi® network device coupled to facilitate communications between the processor 812 and another device (such as a remote user device and/or a smart card device, not separately shown in FIG. 8).

The memory device 840 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of AI metadata instructions 842-1, AI sensor data instructions 842-2, AI language data instructions 842-3, metadata data 844-1, sensor data 844-2, and/or language data 844-3. In some embodiments, the AI metadata instructions 842-1, AI sensor data instructions 842-2, AI language data instructions 842-3 may be utilized by the processor 812 to provide output information via the output device 816 and/or the communication device 818.

According to some embodiments, the AI metadata instructions 842-1 may be operable to cause the processor 812 to process the metadata data 844-1, sensor data 844-2, and/or language data 844-3 in accordance with embodiments as described herein. Metadata data 844-1, sensor data 844-2, and/or language data 844-3 received via the input device 814 and/or the communication device 818 may, for example, be analyzed, sorted, filtered, decoded, decompressed, ranked, scored, plotted, and/or otherwise processed by the processor 812 in accordance with the AI metadata instructions 842-1. In some embodiments, metadata data 844-1, sensor data 844-2, and/or language data 844-3 may be fed by the processor 812 through one or more mathematical, AI logic (e.g., neural network), and/or statistical formulas and/or models in accordance with the AI metadata instructions 842-1 to convert the metadata 844-1 (e.g., smart card and/or related data) to one or more metadata numeric values and/or to identify similar user queries/claims of loss based on a comparison of the one or more metadata numeric values with a plurality of stored metadata numeric values for other/previous matters, as described herein.

In some embodiments, the AI sensor data instructions 842-2 may be operable to cause the processor 812 to process the metadata data 844-1, sensor data 844-2, and/or language data 844-3 in accordance with embodiments as described herein. Metadata data 844-1, sensor data 844-2, and/or language data 844-3 received via the input device 814 and/or the communication device 818 may, for example, be analyzed, sorted, filtered, decoded, decompressed, ranked, scored, plotted, and/or otherwise processed by the processor 812 in accordance with the AI sensor data instructions 842-2. In some embodiments, metadata data 844-1, sensor data 844-2, and/or language data 844-3 may be fed by the processor 812 through one or more mathematical, AI logic (e.g., neural network), and/or statistical formulas and/or models in accordance with the AI sensor data instructions 842-2 to convert the sensor data 844-2 (e.g., image and/or other sensor data) to one or more sensor data numeric values and/or to identify similar user queries/claims of loss based on a comparison of the one or more sensor data numeric values with a plurality of stored sensor data numeric values for other/previous matters, as described herein.

According to some embodiments, the AI language data instructions 842-3 may be operable to cause the processor 812 to process the metadata data 844-1, sensor data 844-2, and/or language data 844-3 in accordance with embodiments as described herein. Metadata data 844-1, sensor data 844-2, and/or language data 844-3 received via the input device 814 and/or the communication device 818 may, for example, be analyzed, sorted, filtered, decoded, decompressed, ranked, scored, plotted, and/or otherwise processed by the processor 812 in accordance with the AI language data instructions 842-3. In some embodiments, metadata data 844-1, sensor data 844-2, and/or language data 844-3 may be fed by the processor 812 through one or more mathematical, AI logic (e.g., neural network), and/or statistical formulas and/or models in accordance with the AI language data instructions 842-3 to convert the language data 844-3 (e.g., text, audio, and/or other voice data) to one or more language data numeric values and/or to identify similar user queries/claims of loss based on a comparison of the one or more language data numeric values with a plurality of stored language data numeric values for other/previous matters, as described herein.

According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data such as the AI metadata instructions 842-1, AI sensor data instructions 842-2, AI language data instructions 842-3, metadata data 844-1, sensor data 844-2, and/or language data 844-3, each of which is presented in reference to FIG. 8 herein. In some embodiments, instructions stored on the data storage devices 740*a-e* may, when executed by a processor, cause the implementation of and/or facilitate the methods 400, 500, 600 of FIG. 4, FIG. 5, and/or FIG. 6 herein, and/or portions or combinations thereof.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 948*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes know or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache such as a Level 2 (L2) cache memory device. According to some embodiments, the fifth data storage device 940*e* may comprise an on-chip memory device such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. AI though particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for automatically classifying multimedia claim data utilizing Artificial Intelligence (AI), comprising:

an electronic processing device; and a non-transitory computer-readable memory device storing instructions comprising (i) a claim similarity AI model, (ii) a claim severity AI model, (iii) a claim pricing AI model, and (iv) an AI chat module, wherein execution of the stored instructions by the electronic processing device results in:

receiving, by the electronic processing device and from a mobile application of a mobile electronic device of an insured party and as an initiation of a process to submit a current insurance claim, an indication of computer-readable data stored on a smart card;

identifying, by the electronic processing device and utilizing the data stored on the smart card, a two-factor authentication challenge;

transmitting, to the mobile electronic device of the insured party and in response to the identifying of the two-factor authentication challenge, the two-factor authentication challenge;

receiving, from the mobile electronic device of the insured party, an indication of a response to the two-factor authentication challenge;

authenticating, by the electronic processing device and utilizing the response to the two-factor authentication challenge, the insured party;

converting, by an execution of the claim similarity AI model by the electronic processing device and utilizing a first mathematical model, the data stored on the smart card into a first number;

receiving, from the mobile application of the mobile electronic device of the insured party, an indication of sensor data obtained by the mobile electronic device;

converting, by an execution of at least one of the claim similarity AI model and the claim severity AI model by the electronic processing device and utilizing a second mathematical model, the sensor data into a second number;

generating, by an execution of the AI chat module by the electronic processing device and based at least in part on the data stored on the smart card, at least one chat query;

receiving, from the mobile application of the mobile electronic device of the insured party and in response to the generating of the at least one chat query, an indication of a textual chat response from the insured party;

converting, by an execution of at least one of the claim similarity AI model and the claim severity AI model by the electronic processing device and utilizing a third mathematical model, the textual chat response into a third number;

comparing, by the electronic processing device, utilizing the first, second, and third numbers, and by accessing a database storing data descriptive of a plurality of historic claims data, the current insurance claim to previous insurance claims;

identifying, by the electronic processing device and based on the comparing, at least one previous insurance claim that is numerically similar to the current insurance claim within a predefined confidence threshold;

computing, by an execution of the claim pricing AI model by the electronic processing device and utilizing claim payment data stored with respect to the at least one previous insurance claim, a resolution for the current insurance claim; and transmitting, by the electronic processing device and to the mobile electronic device of the insured party and in response to the computing of the resolution for the current insurance claim, a visual indication of the resolution for the current insurance claim.

2. The system for automatically classifying multimedia claim data utilizing AI of claim 1, wherein the instructions further comprise:

(v) an AI fraud detection model.

3. The system for automatically classifying multimedia claim data utilizing AI of claim 2, wherein the execution of the instructions by the electronic processing device further results in:

comparing, by an execution of the AI fraud detection model by the electronic processing device, utilizing at least one of the first, second, and third numbers, and by accessing the database storing data descriptive of the plurality of historic claims data, the current insurance claim to previous insurance claims in which fraud had occurred; and computing, by the execution of the AI fraud detection model by the electronic processing device and based on the comparing of the current insurance claim to the previous insurance claims in which fraud had occurred, a statistical likelihood that the current insurance claim is fraudulent.

4. The system for automatically classifying multimedia claim data utilizing AI of claim 1, wherein the instructions further comprise:

(v) a cause of loss AI model.

5. The system for automatically classifying multimedia claim data utilizing AI of claim 4, wherein the execution of the instructions by the electronic processing device further results in:

comparing, by an execution of the cause of loss AI model by the electronic processing device, utilizing at least one of the first, second, and third numbers, and by accessing the database storing data descriptive of the plurality of historic claims data, the current insurance claim to previous insurance claims in which a cause of loss was identified; and computing, by the execution of the cause of loss AI model by the electronic processing device and based on the comparing of the current insurance claim to previous insurance claims in which a cause of loss was identified, a cause of loss for the current insurance claim.

6. The system for automatically classifying multimedia claim data utilizing AI of claim 1, wherein the computer-readable data stored on the smart card is stored in a two-dimensional bar code.

7. The system for automatically classifying multimedia claim data utilizing AI of claim 1, wherein the computer-readable data stored on the smart card is stored in a memory device accessible by near-field communication interrogation.

8. The system for automatically classifying multimedia claim data utilizing AI of claim 1, wherein the computer-readable data stored on the smart card comprises at least one of a name of the insured party, an address of the insured party, a policy number of the insured party, and a vehicle identifier of a vehicle owned by the insured party.

9. The system for automatically classifying multimedia claim data utilizing AI of claim 1, wherein the response to the two-factor authentication challenge comprises a voice imprint.

10. The system for automatically classifying multimedia claim data utilizing AI of claim 1, wherein the response to the two-factor authentication challenge comprises a facial image.

11. The system for automatically classifying multimedia claim data utilizing AI of claim 1, wherein the sensor data comprises at least one of image and video data.

12. The system for automatically classifying multimedia claim data utilizing AI of claim 1, wherein the sensor data comprises data captured from an accelerometer of the mobile electronic device.

13. The system for automatically classifying multimedia claim data utilizing AI of claim 1, wherein the sensor data comprises data captured from a sensor coupled to a home monitoring system within a home of the insured party.

14. The system for automatically classifying multimedia claim data utilizing AI of claim 1, wherein the sensor data comprises data acquired from a third-party device.

* * * * *